United States Patent
Sakashita et al.

(10) Patent No.: US 10,996,954 B2
(45) Date of Patent: May 4, 2021

(54) CALCULATION PROCESSING APPARATUS AND METHOD FOR CONTROLLING CALCULATION PROCESSING APPARATUS

(71) Applicant: FUJITSU LIMITED, Kawasaki (JP)

(72) Inventors: Sota Sakashita, Kawasaki (JP); Yasunobu Akizuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/594,569

(22) Filed: Oct. 7, 2019

(65) Prior Publication Data

US 2020/0117459 A1    Apr. 16, 2020

(30) Foreign Application Priority Data

Oct. 10, 2018   (JP) .............................. JP2018-191337

(51) Int. Cl.
*G06F 9/30* (2018.01)
*G06F 9/54* (2006.01)
*G06F 12/0875* (2016.01)

(52) U.S. Cl.
CPC ...... *G06F 9/30196* (2013.01); *G06F 9/30029* (2013.01); *G06F 9/30043* (2013.01); *G06F 9/30189* (2013.01); *G06F 9/544* (2013.01); *G06F 12/0875* (2013.01)

(58) Field of Classification Search
CPC .. G06F 9/30196; G06F 9/30043; G06F 9/544; G06F 12/0875; G06F 9/30189; G06F 9/30029; G06F 2212/1024; G06F 12/0859; G06F 2212/452; G06F 9/3824; G06F 9/3834
See application file for complete search history.

(56) References Cited

U.S. PATENT DOCUMENTS

| | | | | |
|---|---|---|---|---|
| 5,754,812 A | * | 5/1998 | Favor | .................. G06F 9/30149 712/214 |
| 6,092,175 A | * | 7/2000 | Levy | .................. G06F 9/30076 712/215 |
| 6,266,767 B1 | * | 7/2001 | Feiste | ..................... G06F 9/383 710/54 |

(Continued)

FOREIGN PATENT DOCUMENTS

| | | |
|---|---|---|
| JP | 2009-193378 | 8/2009 |
| JP | 2011-13864 | 1/2011 |
| JP | 2012-173755 | 9/2012 |

*Primary Examiner* — Farley Abad
(74) *Attorney, Agent, or Firm* — Fujitsu Patent Center

(57) ABSTRACT

By including a storing device that stores a plurality of memory access instructions decoded by a decoder and outputs the memory access instruction stored therein to a cache memory, a determiner that determines whether the storing device is afford to store the plurality of memory access instructions; and an inhibitor that inhibits, when the determiner determines that the storing device is not afford to store a first memory access instruction included in the plurality of memory access instructions, execution of a second memory access instruction being included in the plurality of memory access instructions and being subsequent to the first memory access instruction for a predetermined time period, regardless of a result of determination made on the second memory access instruction by the determiner, the calculation processing apparatus inhibits a switch of the order of a store instruction and a load instruction.

10 Claims, 13 Drawing Sheets

(56) References Cited

U.S. PATENT DOCUMENTS

2010/0332800 A1* 12/2010 Sunayama .......... G06F 12/0859
                                                    712/207
2015/0160945 A1*  6/2015 Ashcraft .............. G06F 9/3836
                                                    712/216
2017/0300322 A1* 10/2017 Hirano ................ G06F 9/30043

* cited by examiner

FIG.2

| 22 ↙ | LDSTQ | | 22 ↙ | LDSTQ | | 22 ↙ | LDSTQ | |
|---|---|---|---|---|---|---|---|---|
| | ID_X | ID | | ID_X | ID | | ID_X | ID |
| | 3 | 9 | | 3 | 9 | | 3 | 9 |
| | 3 | 8 | | 3 | 8 | | 3 | 8 |
| | 3 | 7 | | 3 | 7 | | 3 | 7 |
| | 3 | 6 | | 3 | 6 | | 3 | 6 |
| | 3 | 5 | | 3 | 5 | | 3 | 5 |
| | 3 | 4 | | 3 | 4 | | 3 | 4 |
| | 3 | 3 | | 3 | 3 | | 3 | 3 |
| | 3 | 2 | | 3 | 2 | | 3 | 2 |
| | 3 | 1 | | 3 | 1 | | 3 | 1 |
| | 3 | 0 | | 3 | 0 | | 3 | 0 |
| | 2 | 9 | | 2 | 9 | | 2 | 9 |
| | 2 | 8 | | 2 | 8 | | 2 | 8 |
| | 2 | 7 | | 2 | 7 | | 2 | 7 |
| | 2 | 6 | | 2 | 6 | | 2 | 6 |
| | 2 | 5 | | 2 | 5 | | 2 | 5 |
| | 2 | 4 | | 2 | 4 | | 2 | 4 |
| | 2 | 3 | | 2 | 3 | | 2 | 3 |
| | 2 | 2 | | 2 | 2 | | 2 | 2 |
| | 2 | 1 | | 2 | 1 | | 2 | 1 |
| | 2 | 0 | | 2 | 0 | | 2 | 0 |
| | 1 | 9 | | 1 | 9 | | 1 | 9 |
| | 1 | 8 | | 1 | 8 | | 1 | 8 |
| | 1 | 7 | | 1 | 7 | | 1 | 7 |
| | 1 | 6 | | 1 | 6 | | 1 | 6 |
| | 1 | 5 | | 1 | 5 | | 1 | 5 |
| | 1 | 4 | | 1 | 4 | | 1 | 4 |
| | 1 | 3 | | 1 | 3 | | 1 | 3 |
| | 1 | 2 | | 1 | 2 | | 1 | 2 |
| | 1 | 1 | | 1 | 1 | | 1 | 1 |
| | 1 | 0 | | 1 | 0 | | 1 | 0 |
| | 0 | 9 | | 0 | 9 | | 0 | 9 |
| | 0 | 8 | | 0 | 8 | | 0 | 8 |
| | 0 | 7 | | 0 | 7 | | 0 | 7 |
| | 0 | 6 | | 0 | 6 | | 0 | 6 |
| | 0 | 5 | | 0 | 5 | TOQ⇒ | 0 | 5 |
| | 0 | 4 | | 0 | 4 | | 0 | 4 |
| | 0 | 3 | | 0 | 3 | | 0 | 3 |
| | 0 | 2 | TOQ⇒ | 0 | 2 | | 0 | 2 |
| | 0 | 1 | | 0 | 1 | | 0 | 1 |
| TOQ⇒ | 0 | 0 | | 0 | 0 | | 0 | 0 |

| INSTRUCTION | INSTRUCTION ID | LDSTQ_ID_X | LDSTQ_ID |
|---|---|---|---|
| store g4,[g10,4] | 4 | 1 | 2 |
| load g5,[g10,4] | 5 | 1 | 3 |

FIG.4

| cycle | 1 | 2 | 3 | 4 | 5 | 6 | 7 | 8 | 9 | 10 | 11 | |
|---|---|---|---|---|---|---|---|---|---|---|---|---|
| store | P | PT | B1 | B2 check_ng | A | | P | PT | B1 | B2 check_ok | A | |
| load | | P | PT | B1 | B2 check_ok | A | ⇒TO LDSTQ | | | | | ⇒TO LDSTQ |
| ldstq_go | 0 | 0 | 0 | 0 | 1 | 0 | 0 | 0 | 0 | 1 | 0 | |
| LDSTQ RELEASE | 0 | 0 | 0 | 2 | 0 | 0 | 0 | 0 | 0 | 0 | 0 | |

FIG.7

| cycle | 1 | 2 | 3 | 4 | 5 | 6 | 7 | 8 | 9 | 10 | 11 | 12 | |
|---|---|---|---|---|---|---|---|---|---|---|---|---|---|
| store | P | PT | B1 | B2 check_ng | A | A | P | PT | B1 | B2 check_ok | A | ⇒TO LDSTQ |
| load | | P | PT | B1 | B2 check_ok | A | | P | PT | B1 | B2 check_ok | A | ⇒TO LDSTQ |
| ldstq_go | 0 | 0 | 0 | 0 | 0 | 0 | 0 | 0 | 0 | 1 | 1 | 0 |
| inh_ldstqgo | 0 | 0 | 0 | 0 | 1 | 1 | 1 | 1 | 1 | 0 | 0 | 0 |
| LDSTQ RELEASE | 0 | 0 | 0 | 2 | 0 | 0 | 0 | 0 | 0 | 0 | 0 | 0 |

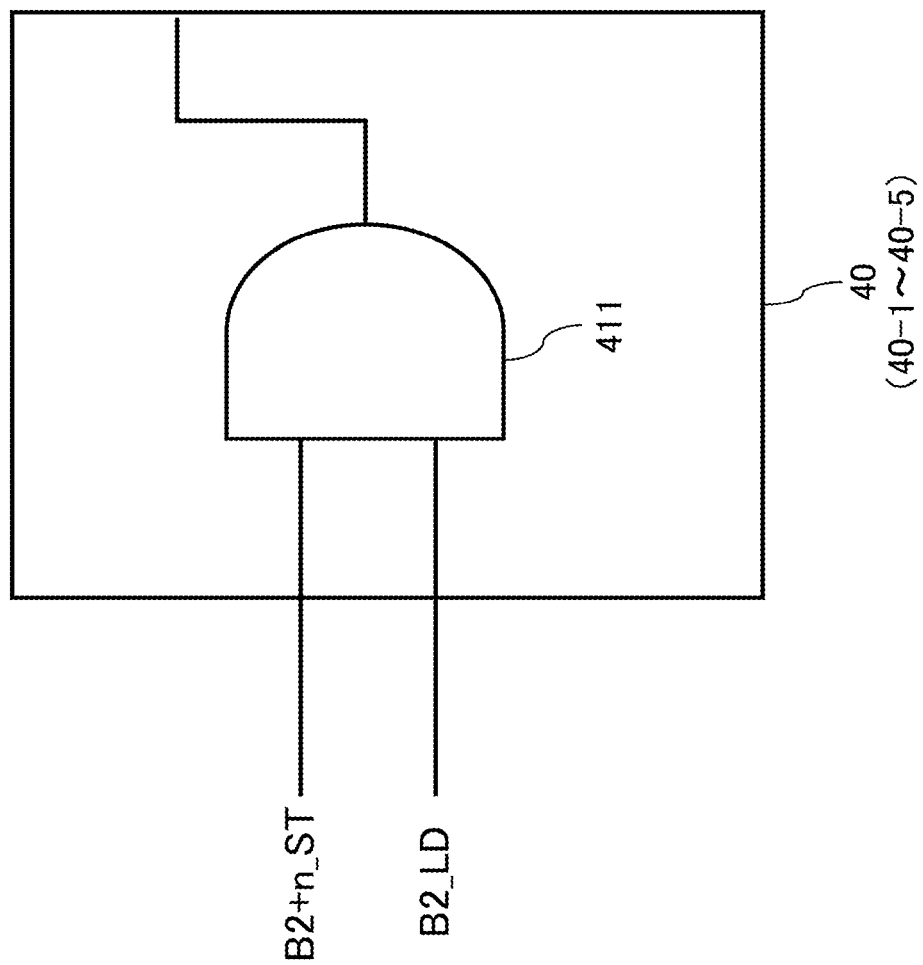

CALCULATION PROCESSING APPARATUS AND METHOD FOR CONTROLLING CALCULATION PROCESSING APPARATUS

CROSS-REFERENCE TO RELATED APPLICATION

This application is based upon and claims the benefit of priority of the prior Japanese Patent application No. 2018-191337, filed on Oct. 10, 2018, the entire contents of which are incorporated herein by reference.

FIELD

The embodiments discussed herein are related to a calculation processing apparatus and a method for controlling a calculation processing apparatus.

BACKGROUND

A processor serving as a calculation processing apparatus included in an information processing apparatus includes one or more processor cores.

A processor core includes an instruction cache, an instruction buffer, a decoder, a reservation station, calculation executor, and a load/store unit. The processor core performs the following process in executing an instruction.

In the instruction cache, one or more instructions are stored, and instructions read from the instruction cache are stored in the instruction buffer and are sequentially sent to the decoder. The decoder interprets the instruction and inserts the instructions to the reservation station.

The reservation station includes a Reservation Station for Execution (RSE) that accumulates calculation instructions and a Reservation Station for Address (RSA) that accumulates load/store instructions.

Insertion of an instruction from each reservation station to the calculator is determined by the reservation station. This insertion of an instruction is carried out in an out-of-order manner in which processable instructions are sequentially processed, not depending on the alignment order of the instruction, so that the efficiency in using the calculator is enhanced. A load instruction and a store instruction selected in the RSA are executed in an address generating calculator.

The RSA sends the number of a fixed point register (GPR) for data to be used in address calculation to the calculation executor. The data of the fixed point register referred to on the basis of the register number is sent to the address generating calculator and is used for execution of calculation. The output of the address generating calculator is an address of a memory to be accessed by a load instruction and a store instruction.

The RSA issues a request for loading or storing to the load/store unit concurrently with the timing when the address calculation is performed. Upon receipt of the request, the load/store unit executes loading or storing, storing the request into a Load & Store Queue (LDSTQ) that accumulates therein load instructions and store instructions. At the timing of issuing the request to the load/store unit, the RSA releases the entry that has stored the instruction and sends the notification representing the release to the decoder.

In cases where the executing load instruction is completed, the load/store unit stores the result of reading the memory into the fixed point register and then releases the LDSTQ. In cases where the load instruction is not completed due to, for example, a cache miss, the request is aborted and issued again from the LDSTQ.

RELATED ART REFERENCE

Patent Literature

[Patent Literature 1] Japanese Laid-open Patent Publication No. 2009-193378

SUMMARY OF INVENTION

Problems to be Solved by Invention

Unfortunately, such a conventional processor sometimes executes, in an instruction string that first stores data into a cache line and then loads data from the same cache line, the loading before the storing because of the out-of-order control.

In this case, since data is read from the cache memory before the storing is executed, wrong data is consequently returned as a result. Unless receiving a request after the RSA issues an instruction and address calculation is carried out, the LDSTQ does not recognize that a store instruction is present before the load instruction and the store instruction refers to the same address as that of the load instruction. The control that the LDSTQ waits for the issue of an antecedent instruction from the RSA substantially equals to invalidating the out-of-order and is not carried out in the viewpoint of the performance.

For the above, the load instruction is regarded to be executed successfully and therefore is released from the LDSTQ. Although the loading is required to be reexecuted, whether reexecution is required is revealed when the store instruction reaches the LDSTQ. Therefore, reexecution is carried out on the next instruction, which is triggered by a store instruction. Since this reexecutes one or more instructions already released from the RSA or the LDSTQ, a process from fetching the instruction is carried out again. The time for this reexecution largely affects lowering of the performance.

SUMMARY

According to an aspect of the embodiments, a calculation processing apparatus includes: a cache memory; a decoder that decodes a plurality of memory access instructions; a storing device that stores the plurality of memory access instructions decoded by the decoder and outputs the memory access instruction stored therein to the cache memory; a determiner that determines whether the storing device is afford to store the plurality of memory access instructions; and an inhibitor that inhibits, when the determiner determines that the storing device is not afford to store a first memory access instruction included in the plurality of memory access instructions, execution of a second memory access instruction being included in the plurality of memory access instructions and being subsequent to the first memory access instruction for a predetermined time period, regardless of a result of determination made on the second memory access instruction by the determiner.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram is a diagram illustrating a manner of managing an LDSTQ related to a processor core of an example of the embodiment;

FIG. 3 is a diagram illustrating an example of an instruction string of a processor core;

FIG. 4 is a time chart illustrating a switch of the order to loading and storing in a processor core of an example of the embodiment;

FIG. 7 is a time chart illustrating a process performed in a processor core of an example of the first embodiment;

FIG. 13 is a diagram illustrating a configuration of a store/load confirmer of a modification to a processor core of the second embodiment.

DESCRIPTION OF EMBODIMENT(S)

Hereinafter, a calculation processing apparatus and a method for controlling the calculation processing apparatus according to embodiments will now be detailed with reference to accompanying drawings. The following embodiments are exemplary and there is no intention to exclude various modifications and applications of techniques not explicitly referred in the embodiments. In other words, various changes and modifications can be suggested without departing from the scope of the embodiments (e.g., combining the embodiments and modifications). The drawings do not illustrate therein all the functions and elements included in the embodiments and may include additional functions and elements to those illustrated in the accompanying drawings.

(A) Related Technique

A processor core is a calculation processing apparatus that carries out a calculation process and is included in a Central Processing Unit (CPU).

A CPU is included in an information processing apparatus such as a computer and achieves various calculation processes. For example, an information processing apparatus includes a CPU, a main memory, and a storing device. The CPU, the main memory, and the storing device are connected to one another via a bus and communicate with one another. The CPU includes one or more processor cores 1.

Figure 1:
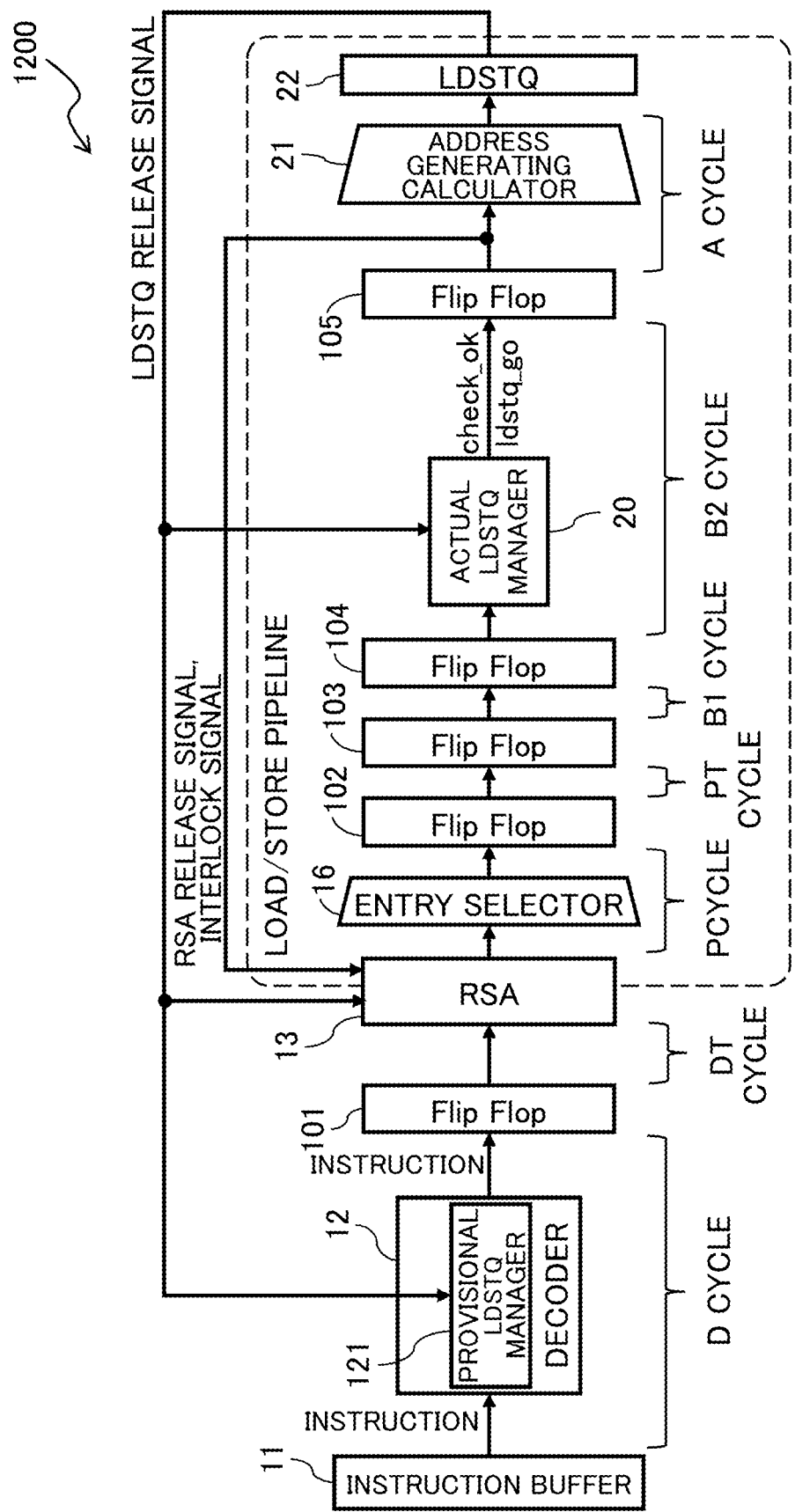
FIG. 1 is a diagram illustrating an instruction pipeline related to a processor core according to an example of an embodiment.

FIG. 1 is a diagram illustrating an instruction pipeline related to a processor core according to an example of an embodiment.

An instruction pipeline includes multiple processing stages (pipeline stages). The processing stages include cycles called a Decode (D) cycle and a Decode-Transfer (DT) cycle. A D cycle and a DT cycle are processing stages common to a load/store instruction and a calculation instruction.

The processing stages further includes processing stages called a Priority (P) cycle, a Priority Transfer (PT) cycle, a Buffer 1 (B1) cycle, a Buffer 2 (B2) cycle, an Address Generate (A) cycle.

A load/store instruction is a memory access instruction that accompanies data access to a memory including loading and storing, and is executed by an instruction pipeline 1200 that includes five processing stages of the P cycle, the PT cycle, the B1 cycle, the B2 cycle, and the A cycle. Hereinafter, an instruction pipeline that executes a load/store instruction is sometimes referred to as a load/store pipeline 1200. A load/store pipeline 1200 corresponds to a path from the RSA 13 to the LDSTQ 22.

In the D cycle, the decoder 12 obtains an instruction from the instruction buffer 11. The decoder 12 decodes the obtained instruction and outputs the decoded instruction to a flip-flop 101 to transmit the decoded instruction to the RSA 13 of the reservation station. In the D cycle, the decoder 12 manages the number of load/store instructions to be output to the LDSTQ 22 and provisionally allocates a load/store instruction to an entry of the LDSTQ 22. Here, provisionally allocating means that identification information obtained by virtually increasing the number of entries of the LDSTQs 22 is allocated as a virtual entry to a load/store instruction.

In the DT cycle, the instruction decoded in the D cycle is forwarded through the flip-flop 101 and stored into the RSA 13 of the reservation station.

Next, description will now be made in relation to the respective processing stages of the load/store pipeline 1200. In the P cycle, the entry selector 16 determines an instruction to be inserted to the address generating calculator 21 among the instructions stored in the RSA 13 of the reservation station. After that, the entry selector 16 outputs data of the determined instruction to the flip-flop 102.

In the PT cycle, the instruction code of the instruction determined in the P cycle is forwarded from the flip-flop 102 to the flip-flop 103.

In the B1 cycle and the B2 cycle, the flip-flops 103-105 provide data with delay concurrently with the timing when the data is read from the fixed point register (GPR). Besides, the actual LDSTQ manager 20 checks whether an entry of the LDSTQ 22 corresponding to an entry provisionally allocated in the D cycle is actually empty, using a LDSTQ release signal output from the LDSTQ 22.

In cases where the LDSTQ 22 has an empty space, the actual. LDSTQ manager 20 outputs, to the flip-flop 105, an instruction code that is to be input into the address generating calculator 21. On the other hand, in cases where the LDSTQ 22 has no empty space, the actual LDSTQ manager 20 outputs, to the flip-flop 105, an instruction code to be returned to the RSA 13 and also outputs an interlock signal to the flip-flop 105.

In the A cycle, in cases where the entry of the LDSTQ 22 is not empty, the instruction code passing through the flip-flop 105 is cancelled to be executed and then returned to the RSA 13. Furthermore, an interlock signal passing through the flip-flop 105 is sent to the RSA 13. In contrast to the above, in cases where the entry of the LDSTQ 22 is empty, the instruction code passing through the flip-flop 105 is input into the address generating calculator 21. Furthermore, data to be used for address generating calculation is input into the address generating calculator 21.

The address generating calculator 21 carries out address generating calculation and sends the generated address and a load/store request to the LDSTQ 22. The LDSTQ 22 outputs the address to a data cache (omitted in FIG. 1), and then outputs an LDSTQ release signal to the RSA 13 and the actual LDSTQ manager 20.

The actual LDSTQ manager 20 determines, using the actual number of the entries of the LDSTQ 22, whether a load/store instruction can be allocated to an entry, which means that the load/store instruction can be stored in the LDSTQ 22. If the load/store instruction can be allocated to an entry of the LDSTQ 22 the provisional entry given by the decoder 12 is changed to the actual entry of the LDSTQ 22 by the actual LDSTQ manager 20.

In the above manner, in the decoder 12, a provisional entry number is allocated to a load/store instruction, which provisional entry number has an upper limit called the instruction issuing upper limit number larger than the number of entries of the LDSTQ 22. After that, in the actual LDSTQ manager 20 arranged at the B2 cycle being a later processing stage, whether the LDSTQ 22 has an empty space is checked. This can reduce the number of cycles from outputting of an LDSTQ release signal from the LDSTQ 22 to the allocating a new load/store instruction to an entry of the LDSTQ 22. This means that the number of cycles from the release of an entry of the LDSTQ 22 to the occupation of the released entry can be reduced.

For example, in allocating an actual entry of the LDSTQ 22 by the decoder 12, the cycles until the released entry is occupied takes seven cycles from the D cycle to the A cycle at the maximum. In contrast to the above, in allocating an actual entry of the LDSTQ 22 by the actual LDSTQ manager 20, the cycles until the released entry is occupied can be reduced to two cycles of the B2 cycle to the A cycle at the maximum. Even if the RSA 13 sets interlock, the number of cycles from outputting of an LDSTQ release signal from the LDSTQ 22 to the occupation of the released entry can be reduced to five cycles from the P cycle to the A cycle at the maximum.

Here, the actual LDSTQ manager 20 reduces the process by allocating an actual entry of the LDSTQ 22 to a load/store instruction after the load/store instruction to be stored in the LDSTQ 22 is selected. For example, in cases where a determination is made in the RSA 13 as to whether the provisional allocation can be converted to allocation to an actual entry of the LDSTQ 22, a mechanism that makes the determination on all the load/store instructions that the RSA 13 retains may be arranged. Since the RSA 13 retains entries as many as the instruction issuing upper limit number at the maximum, a mechanism for allocating to an actual entry of the LDSTQ 22 is arranged.

A case where the determination is made before a load/store instruction to be stored in the LDSTQ 22 is selected requires a large circuit scale. As a solution to the above, the actual LDSTQ manager 20 is preferably arranged downstream of the entry selector 16. The actual LDSTQ manager 20 can be arranged in any position between the entry selector 16 and the address generating calculator 21, preferably at position closed to the address generating calculator 21. If the actual LDSTQ manager 20 is closer to the address generating calculator 21, the cycles from outputting an LDSTQ release signal to the occupying the released entry can be further shortened.

A provisional LDSTQ number is allocated in the D cycle described above and a determination is made on the basis of the provisional LDSTQ number as to whether the LDSTQ actually has an empty space in the B2 cycle. In cases where the actual LDSTQ 22 is determined to have no empty space in the B2 cycle, the instruction is returned to the RSA 13 and the RSA 13 sets interlock for the purpose of issuing inhabitation to avoid repetitious issuing when the LDSTQ 22 has no empty space. To manage the number of use of the LDSTQ 22, an LDSTQ release signal is sent to the decoder 12 and the B2 cycle. In order to unlock the interlock, the LDSTQ release signal is also output to the RSA 13.

FIG. 2 is a diagram is a diagram illustrating a manner of managing an LDSTQ related to a processor core of an example of the embodiment.

The LDSTQ 22 illustrated in FIG. 2 is actually formed to be ten entries having IDs of 0-9. The IDs are virtually expanded by expressing the IDs attached thereto X_ID (0-3) and consequently, the LDSTQ 22 is managed to have 40 entries.

In FIG. 2, the reference sign (a) represents a status of using the LDSTQ 22 in the initial state; the reference sign (b) represents a status of using the LDSTQ 22 at some time point; and the reference sign (c) represents a status of using the LDSTQ 22 at a time point after a predetermined time period from the time point represented by the reference sign (b).

The letters of TOQ (Top Of Queue) represents the position (LDSTQ number) of a leading load/store instruction among the load/store instructions stored in the LDSTQ 22.

Since the actual LDSTQ 22 has ten entries, the ten entries from ID=0 of ID_X=0 enclosed by a thick frame are actually usable combinations of an ID_X and an ID as illustrated in the reference sign (a) in the initial state.

The actual LDSTQ manager 20 at the B2 cycle determines whether the LDSTQ 22 has an empty space by confirming whether the ID and the ID_X allocated by the decoder 12 are included in the combination of the thick frame.

The TOQ is updated by releasing the LDSTQ 22. For example, when two entries are released in the status represented by the reference sign (a), the LDSTQ 22 is moved into a status represented by the reference sign (b). Releasing entries of the LDSTQ 22 is carried out from the TOQ in the in-order fashion, the TOQ moves to an entry of ID_X=0 and ID=2, which proceeds by two entries from the previous TOQ. This move of the TOQ accompanies move of the thick frame representing valid ten entries by two entries. Even having the common ID=0, the entry having ID_X=0 was valid in the status represented by the reference sign (a) but becomes invalid in the status represented by the reference sign (b), and in turn, an entry having ID_X=1 comes to be valid in the state represented by the reference sign (b).

Allocation of an ID and an ID_X in the LDSTQ 22 are accomplished by the provisional LDSTQ manager 121, and an ID and an ID_X in the LDSTQ 22 are allocated in the order of their numbers. An ID and an ID_X in the LDSTQ 22 are cyclically updated, which means that an ID and an ID_X in the LDSTQ 22 are each wrap around. For example, if an ID (in this example, ten entries exist) exceeds nine, the next ID is allocated 0, and the ID_X is incremented.

Next, description will now be made in relation to an operation performed until the order of storing and loading is switched due to a gap of a checking timing in the LDSTQ 22.

FIG. 3 is a diagram illustrating an example of an instruction string of a processor core.

In FIG. 3, a store instruction (store) and a load instruction (load) are illustrated. The store instruction exemplarily illustrated in FIG. 3 writes data stored in a fixed point register g4 into a memory address of adding the number of four (+4) to the data stored in the register g10.

The load instruction exemplarily illustrated in FIG. 3 refers to the memory address of adding the number of four (+4) to the data stored in the fixed point register g10 and stores the data read from the memory address into the register g5.

The store instruction and the load address refer to the same fixed point register g10, and the value of the addition is the same, and consequently access to the exactly same memory address. This means that since the data that the load instruction reads from the memory is the value of the register g4 that the store instruction has stored, data consistency is not ensured unless the load instruction is executed after the execution of the store instruction.

Switching the order of the load instruction and the store instruction corresponds to the switching of the store/load issuing order. When such switching the order of the load instruction and the store instruction occurs, the data consistency is not able to be ensured.

FIG. 4 is a time chart illustrating a switch of the order of loading and storing in a processor core of an example of the embodiment.

In FIG. 4, an example of processing which the store instruction (store) and the load instruction (load) exemplarily illustrated in FIG. 3 will now be described.

In the example illustrated in FIG. 4, "store" is selected at the cycle 1 and "load" is selected at the cycle 2 by the RSA 13. Basically, the RSA 13 preferentially selects an older instruction. At this time point, the order of the instructions is not switched.

At the cycle 4, the actual LDSTQ manager 20 determines whether the LDSTQ 22 has an empty space for the "store". At this time point, the LDSTQ 22 is assumed to be in the status represented by the reference sign (b) of FIG. 2. As illustrated in FIG. 3, the "store" has an LDSTQ_ID of 2 and an ID_X of 1, which is not included in the thick frame of the status of the reference sign (b) of FIG. 2. For the above, the LDSTQ 22 is determined not to have an empty space, and resulted in check_ng in cycle 4.

Consequently, the "store" is returned to the RSA 13 at the cycle 6 and selected again by the RSA 13 at the cycle 7. Since the LDSTQ release is two at the cycle 4, the LDSTQ 22 comes to be in the status of FIG. 2(c) in which two entries proceed at the next cycle 5. At this timing, since the LDSTQ 22 has an empty space for the "store", but the determination of the presence of the empty space has been already made, the determination to return the "store" to the RSA 13 is unchanged.

In contrast, in relation to the "load", since the actual LDSTQ manager 20 determines whether the LDSTQ 22 has an empty space at the timing of the cycle 5, the LDSTQ 22 is determined to have an empty space (check_ok) although the ID and ID_X are later than the "store". Consequently, the "load" is sent to the LDSTQ 22 at the timing of the cycle 6. At this point, the "load" goes ahead of the "store" so that the order of the "store" and the "load" switches.

In the above processor core of the related art described above has a problem of developing the opportunity of switching the order of issuing the "store" and the "load".

When a store instruction and a load instruction are issued from the RSA 13 in the original order, a case where only the antecedent store instruction fails to be allocated to the LDSTQ 22 is possible. In allocating an instruction to the LDSTQ 22, the LDSTQ 22 to which an instruction issued from the RSA 13 is provisionally allocated is checked to whether is actually empty.

The LDSTQ 22 is released sequentially from the leading position and there is a possibility that multiple entries in the LDSTQ 22 are simultaneously released. In some timing, an antecedent store instruction is not allocated because the LDSTQ 22 is not released but many entries of the LDSTQ 22 are released until check on a subsequence load instruction is executed at the ensuing cycle, so that the load instruction may be able to be allocated to the LDSTQ 22.

In the above case, the store instruction fails in the allocation and is temporarily returned to the RSA 13 and then issued again. In the meanwhile, a load instruction is issued to the LDSTQ 22. This behavior switches the execution order of the store instruction and the load instruction as described above.

(B) First Embodiment

The processor according to an example of the first embodiment reduces the risk of reexecution of instructions, which is caused by switching of the execution order of the store instruction and the load instruction.

Figure 5:
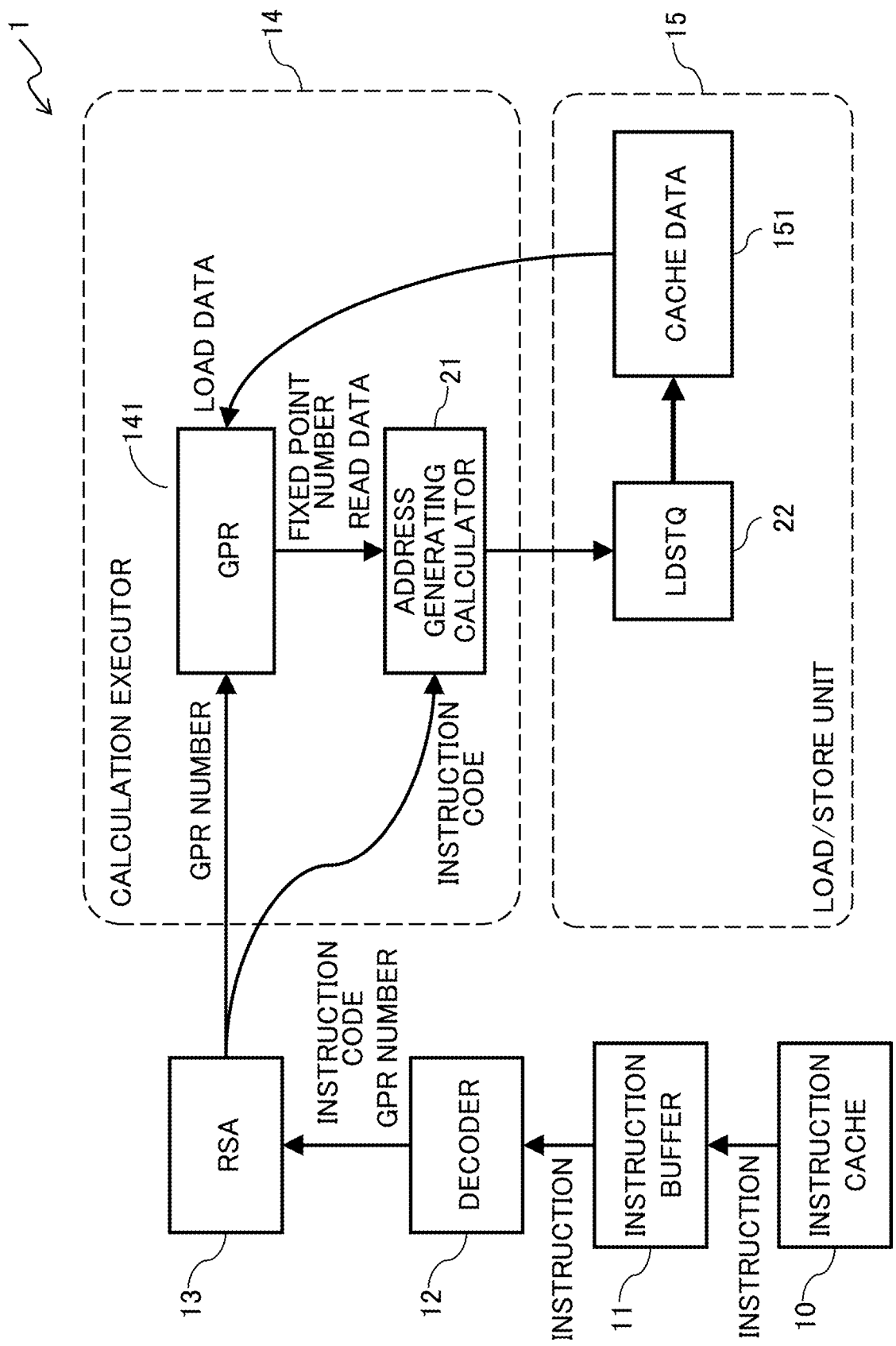
FIG. 5 is a diagram illustrating a configuration of a processor core of an example of a first embodiment.

(B-1) Configuration:

FIG. 5 is a diagram illustrating a configuration of a processor core 1 of an example of the first embodiment.

An information processing apparatus includes a processor having one or more processor cores 1. The processor is a calculation processing apparatus.

The processor core 1 exemplarily illustrated in FIG. 5 includes an instruction cache 10, an instruction buffer 11, a decoder 12, an RSA 13, a calculation executor 14, and a load/store unit 15. The processor core 1 carries out the following process in executing an instruction.

In the instruction cache 10, instructions are stored. Instructions read from the instruction cache 10 are stored in the instruction buffer 11, and are sequentially sent to the decoder 12. The decoder 12 interprets each received instruction and inserts the instruction into a reservation station.

The reservation station includes an RSE (instruction: not illustrated) that accumulates therein calculation instructions and the RSA 13 that accumulates therein load/store instructions. A load/store instruction is a memory access instruction. The reservation station may further include a Reservation Station for Branch (RSBR) that accumulates therein branch instructions.

Insertion of an instruction from each reservation station to the calculator is determined by the reservation station per se. This insertion of an instruction is carried out in an out-of-order fashion, in which instructions having overcome the register dependency are preferentially issued from the reservation station irrespective of the original order of the instructions so that the efficiency in using the calculator can be enhanced.

The RSA 13 receives an input of a load/store instruction along with a provisional LDSTQ number from the decoder 12. The RSA 13 accumulates therein the obtained load/store instruction along with the provisional LDSTQ number. Then the RSA 13 selects a load/store instruction to be output from among accumulated load/store instructions. After that, the RSA 13 outputs an instruction code (instruction ID) of the selected load/store instruction which code represents, for example, whether the instruction is data reading or data writing, along with its provisional LDSTQ number to the actual LDSTQ manager 20. The RSA 13 outputs a fixed point register number assigned by the selected load/store instruction to the GPR 141. Furthermore, the RSA 13 outputs, to the decoder 12, a release signal of the RAS 13 that represents the RSA 13 has output the load/store instruction.

The RSA 13 receives, from the actual LDSTQ manager 20, an input of a load/store instruction that has not output to the LDSTQ 22. Furthermore, the RSA 13 receives an input of an interlock signal along with the returned load/store instruction from the actual LDSTQ manager 20. The RSA 13 interlocks the returned load/store instruction and stands by until the load/store instruction is output (i.e., inhibits issue of the load/store instruction for a predetermined time period).

At that time, the RSA 13 continues to output load/store instructions not being interlocked to the actual LDSTQ manager 20. For the above, multiple load/store instructions may be returned along with an interlock signal from the actual LDSTQ manager 20 to the RSA 13 in some cases. In this event, the RSA 13 interlocks all the returned load/store instructions and stands by until the interlocked load/store instructions are output. This can avoid lowering the processing performance of the processor core 1 caused by, when the LDSTQ 22 is not released for a long time, the RSA 13 repeatedly issuing the same load/store instruction and thereby inhibiting issue of another instruction.

After that, the RSA 13 receives an input of an LDSTQ release signal from the LDSTQ 22. Being triggered by the input of the LDSTQ release signal, the RSA 1.3 cancels the interlock of all the interlocked load/store instructions. The RSA 13 sequentially outputs all the load/store instructions hold therein, including reissuing of the load/store instructions on which interlock has been cancelled.

Here, the releasing of the LDSTQ 22 is carried out along the original order of instructions. For this reason, unless the previous load/store instruction is output, an entry that is to store the subsequent load/store instruction is not released. Accordingly, once an LDSTQ release signal is output from the LDSTQ 22, the RSA 13 has a high possibility of successively receiving inputs of LDSTQ release signals.

To deal with the above, the RSA 13 can output a load/store instruction for which the RSA 13 has a high possibility of receiving a release signal in advance by cancelling, when receiving a single LDSTQ release signal, all the interlocks. This makes is possible to store a new load/store instruction into the LDSTQ 22 at the timing of outputting the LDSTQ release signal, so that the efficiency of storing a load/store instruction into the LDSTQ 22 can be enhanced. Furthermore, this cancellation of the interlock does not use the entry number of the LDSTQ 22 and the number of empty entries, and therefore can suppress increase in circuitry of the processor core 1.

The load instruction and the store instruction selected in the RSA 13 are executed by the address generating calculator 21. For data to be used in address calculation, the RSA 13 sends the number of a fixed point register (GPR) to the calculation executor 14. The data of the fixed point register referred on the basis of the register number is sent to the address generating calculator 21, and is used in execution of the calculation. The output of the address generating calculator 21 is an address of the memory to be accessed by the load instruction or the store instruction.

The RSA 13 selects the oldest instruction among the load instructions and the store instructions that are accumulated therein and that are able to be issued. The selected instruction is executed in the address generating calculator 21.

The RSA 13 sends the number of the fixed point register (General Purpose Register (GPR)) to the calculation executor 14 for the data to be used in address generation. The data read from the GPR referred on the basis of the register number is sent to the address generating calculator 21 and is used in execution of calculation. The output of the address generating calculator 21 is the address of the memory to be accessed by the load instruction or the store instruction.

The RSA 13 issues a request for loading or storing to the load/store unit 15 in line with the timing of execution of address generation. In response to the request, the load/store unit 15 stores the load/store instruction into the LDSTQ 22 (e.g., ten entries) that accumulates therein load instructions and store instructions, and carries out the loading or storing. The RSA 13 releases the entry that has stored the instruction at the timing of issuing the request to the load/store unit 15 and sends the notification of the release to the decoder 12.

The load/store unit 15 includes a data cache 151 and the LDSTQ 22. When completing the load instruction or the store instruction being executed by the load/store unit 15, the load/store unit 15 stores the result of reading the memory into a fixed point register (GPR) 141. Upon completion of processing an instruction, the load/store unit 15 releases the entry of the LDSTQ 22. Release of an entry of the LDSTQ 22 complies with the number sequence of ldstq_ID. This means that the release of an entry is carried out in an in-order fashion in which the entry is not released unless the antecedent instruction is completed. A LDSTQ release signal is sent to, for example, the decoder 12 and the RSA 13. In cases where a load instruction fails in being completed due to, for example, cache miss, the request is aborted and issued again from the LDSTQ 22. The instruction is processed in a pipeline.

The actual LDSTQ manager 20 has information about the entry number of the LDSTQ 22 in advance. The actual LDSTQ manager 20 receives, from the RSA 13, an input of an instruction ID of a load/store instruction. The actual LDSTQ manager 20 receives, from the LDSTQ 22, an input of an LDSTQ release signal.

The actual LDSTQ manager 20 obtains the number of load/store instructions that the LDSTQ 22 retains based on the number of load/store instructions that the actual LDSTQ manager 20 outputs to the LDSTQ 22 and the LDSTQ release signal input from the LDSTQ 22. Then the actual LDSTQ manager 20 determines whether or not the number of load/store instructions that the LDSTQ 22 retains is less than the number of entries of the LDSTQ 22.

In cases where the number of load/store instructions that the LDSTQ 22 retains is less than the number of entries of the LDSTQ 22, the actual LDSTQ manager 20 outputs, to the address generating calculator 21, the instruction code of the load/store instruction input from the RSA 13. In contrast, in cases where the number of load/store instructions that the LDSTQ 22 retains is equal to or more than the number of entries of the LDSTQ 22, the actual LDSTQ manager 20 determines that the LDSTQ 22 is full, which means that the actual LDSTQ manager 20 is not afford (i.e., has no empty space) to store a load/store instruction (incoming memory access instruction) input from the RSA 13. The actual LDSTQ manager 20 functions as a determiner that determines whether the LDSTQ 22 is afford to store a load/store instruction.

In cases where the LDSTQ 22 is full (has no empty space), the actual LDSTQ manager 20 returns the load/store instruction input from the RSA 13 to the RSA 13 and also sends an interlock signal to the RSA 13. Returning a load/store instruction input from the RSA 13 to the RSA 13 corresponds to a situation where the actual LDSTQ manager 20 discards the load/store instruction and requests the RSA 13 to send the same load/store instruction again.

The address generating calculator 21 receives the instruction code of the load/store instruction from the actual LDSTQ manager 20. Furthermore, the address generating calculator 21 receives an input of a value to be used in calculation from the GPR 141. Then the address generating calculator 21 generates an address using the value input from the GPR 141. For example, the address generating calculator 21 generates an address by multiplying the value input from the GPR 141 by a predetermined number. Then the address generating calculator 21 outputs the generated address and the instruction code to the LDSTQ 22, and stores the generated address and the instruction code in the LDSTQ 22.

The LDSTQ 22 serves as a storing device that stores a load/store instruction (memory access instruction) decoded by the decoder 12 and outputs the stored load/store instruction to a data cache (cache memory) 151.

The LDSTQ 22 receives an input of the instruction code of a load/store instruction and the address of the processing target from the address generating calculator 21. Then the LDSTQ 22 stores the instruction code of the load/store instruction and the address of the processing target received from the address generating calculator 21, regarding the number of entries therein as the upper limit. Here, storing the instruction ID of a load/store instruction and the address of a processing target into the LDSTQ 22 is simply referred to as storing a load/store instruction into the LDSTQ 22. The LDSTQ 22 stores load/store instructions in the order of processing.

The LDSTQ 22 processes load/store instructions in the order of being provided with earlier order in processing (i.e., in the order that the LDSTQ indicates). Specifically, when processing of a one-previous load/store instruction is completed, the LDSTQ 22 sends an address assigned by the next load/store instruction to the data cache 151. Then upon completion of the processing of the load/store instruction stored therein, the LDSTQ 22 outputs a LDSTQ release signal to the decoder 12, the RSA 13, and the actual LDSTQ manager 20. Here, in cases where the load/store instruction is not completed due to, for example, cache miss in the data cache 151, the load/store instruction already output is interrupted and the LDSTQ 22 issues the same load/store instruction again. The LDSTQ 22 is an example of the storing device.

The data cache 151 receives an input of an instruction code and an address from the LDSTQ 22. If the data associated with the assigned address is present, the data cache 151 carries out processing using the data.

In processing a load instruction, in cases where data is not present at the assigned address, the data cache 151 obtains the data from a non-illustrated main memory, and stores the obtained data into the data cache 151 per se and also into the GPR 141. In processing a store instruction, the data cache 151 stores the obtained data into the data cache 151 per se and also into an assigned address of the main memory.

Figure 6:
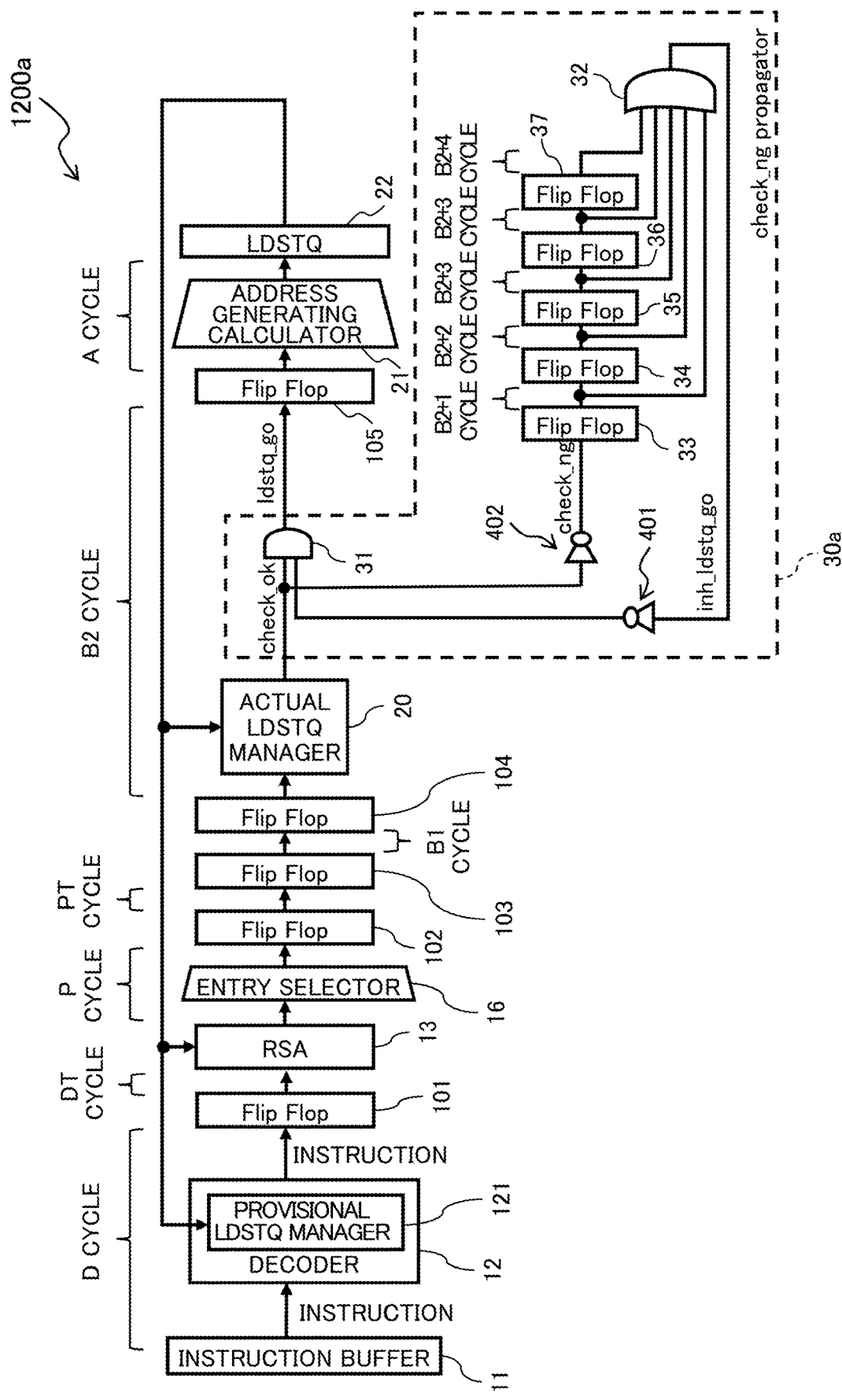
FIG. 6 is a diagram illustrating an instruction pipeline of a processor core of an example of the first embodiment.

FIG. 6 is a diagram illustrating an instruction pipeline (load/store pipeline) of a processor core 1 of an example of the first embodiment.

Like reference numbers designates the same or substantially same elements and parts, so repetitious description is omitted here.

An instruction pipeline (load/store pipeline) 1200a of the processor core 1 according to an example of the first embodiment illustrated in FIG. 6 additionally includes a check_ng propagator 30a to the elements of the load/store pipeline 1200 illustrated in FIG. 1.

The check_ng propagator 30a is interposed between the actual LDSTQ manager 20 and the flip-flop 105.

As illustrated in FIG. 6, the check_ng propagator 30a includes an AND gate 31, an OR gate 32, invertor circuits 401 and 402, and one or more (five in the example of FIG. 6) flip-flops (signal holding circuits) 33-37.

The AND gate 31 is disposed downstream of the actual LDSTQ manager 20. When issuing a store instruction (store), the actual LDSTQ manager 20 checks whether the LDSTQ 22 has an empty entry, and in cases where the LDSTQ 22 has an empty entry, outputs "1" as a check_ok signal.

In case where the LDSTQ 22 does not have an empty entry as a result of checking whether the LDSTQ 22 has an empty entry, the actual. LDSTQ manager 20 outputs "0" as a check_ok signal. In cases where the LDSTQ 22 is determined not to have an empty entry, the issuing of a store instruction is cancelled and the store instruction is returned to the RSA 13. The RSA 13 sets interlock to inhibit issue of an instruction.

Into the AND gate 31, a check_ok signal output from the actual LDSTQ manager 20 is input. The AND gate 31 drops the output signal (check_ok) from the actual LDSTQ manager 20 to "0" by using an input except for the store instruction per se, and outputs the "0" to be a ldstq_go signal.

The ldstq_go signal is input into the address generating calculator 21 via the flip-flop 105. In cases where the ldstq_go=0, the instruction is not issued to the LDSTQ 22, and is returned to the RSA 13.

The check_ok signal output from the actual LDSTQ manager 20 is also input into the invertor circuit 402. The invertor circuit 402 inputs a check_ng signal that corresponds to an inverted check_ok signal into the flip-flop 33. At the downstream of the flip-flop 33, the flip-flops 34-37 are arranged in series. With this arrangement, the check_ng signal output from the invertor circuit 402 is sequentially propagated to the multiple (five in this embodiment) flip-flops 33-37 and then input into the OR gate 32. Besides, the respective outputs of the flip-flops 33-36 are also input into the OR gate 32.

In the check_ng propagator 30a, multiple flip-flops 33-37 are arranged in series and sequentially propagate a check_ng signal based on a check_ok signal output from the actual LDSTQ manager 20.

With this configuration, an output is maintained for a predetermined time corresponding to the number of flip-flops 33-37 (in the present embodiment, five) and an input of the ldstq_go signal from the actual LDSTQ manager 20 to the flip-flop 105 is delayed. Namely, in the check_ng propagator 30a, the flip-flops 33-37 arranged in series and the OR gate 32 into which outputs from the flip-flops 33-37 are input constitute an output maintaining circuit that maintains an output of the check_ng for a predetermined time (e.g., for five cycles).

When a check_ok=0 that represents that the LDSTQ 22 has no empty space is output from the actual LDSTQ manager 20, this output maintaining circuit maintains the ldstq_go signal to be input into the flip-flop 105 to "0" for a predetermined time (in this embodiment, five cycles). Even if the check_ok signal=1 is then output from the actual LDSTQ manager 20, the ldstq_go signal is kept to "0" unless the predetermined time elapses.

The check_ok signal output at the B2 cycle is input into the flip-flop 33 via the invertor circuit 402. After that, at the B2+1 cycle, the check_ng signal output from the flip-flop 33 is propagated to the flip-flop 34 and the OR gate 32.

Likewise, at the B2+2 cycle, the check_ng signal output from the flip-flop 34 is propagated to the flip-flop 35 and the OR gate 32; at the B2+3 cycle, the check_ng signal output from the flip-flop 35 is propagated to the flip-flop 36 and the OR gate 32; at the B2+4 cycle, the check_ng signal output from the flip-flop 36 is propagated to the flip-flop 37 and the OR gate 32; and at the B2+5 cycle, the check_ng signal output from the flip-flop 37 is propagated to the OR gate 32.

This means that the check_ng single obtained by inverting the result (check_ok) of checking the LDSTQ 22 by the actual LDSTQ manager 20 is propagated through the flip-flops 33-37 over the subsequent five cycles, and during the propagation, the signals output from the respective flip-flops 33-37 are input into the OR gate 32.

From the OR gate 32, an inh_ldstq_go signal is output. This inh_ldstq_go signal is input into the invertor circuit 401, inverted, and then input into the AND gate 31.

The output from the invertor circuit 401 is an inverted inh_ldstq_go signal, which is to be used for inhibit issue of an instruction to the LDSTQ 22. Once a check_ng is detected in the actual LDSTQ manager 20, the inh_ldstq_go signal takes the value "1" over the subsequent five cycles. While the value "1" is output to the inh_ldstq_go signal, ldstq_go=0 is input into the flip-flop 105 (address generating calculator 21).

This means that, once a check_ng is detected in the actual LDSTQ manager 20, one or more subsequent instructions issued from the RSA 13 over the subsequent five cycles are inhibited from being issued to the LDSTQ 22 and are returned to the RSA 13.

As the above, the check_ng signal obtained by inverting the LDSTQ check result (check_ok) performed in the actual LDSTQ manager 20 is propagated for the subsequent five cycles through the flip-flops 33-37, and signals on the way of the propagation are used as inputs into the OR gate 32. The output signal from the OR gate 32 is inverted by the invertor circuit 401, input into the AND gate 31, and is then used for dropping the ldstq_go to "0".

In cases where the actual LDSTQ manager 20 determines that the LDSTQ 22 has no empty space and therefore outputs the check_ng, the check_ng propagator 30a inputs the value "0" as the ldstq_go signal (i.e., ldstq_go=0) into the address generating calculator 21 for a predetermined time period (in the present embodiment, for five cycles). Accordingly, the check_ng propagator 30a functions as an inhibitor that inhibits execution of one or more subsequent load/store instructions.

Changing the number of flip-flops (in the present embodiment, five flip-flops 33-37) provided to the check_ng propagator 30a can change the length of time for which execution of load/store instructions is inhibited. The number of flip-flops provided to the check_ng propagator 30a can be appropriately changed, and for example, may be determined, considering the number of instructions that would be issued from the RSA 13 from the selecting "store" from the RSA 13 to the returning the "store" to the RSA 13.

Next, description will now be made in relation to processes of managing the LDSTQ 22 and issuing an instruction to the reservation station that are carried out by the decoder 12.

The decoder 12 manages the number of empty entries of the LDSTQ 22, and determines an entry number of an entry in the LDSTQ 22 into which entry an instruction will be stored. The decoder 12 allocates successive numbers from the value "0" to the LDSTQ_IDs. In the present embodiment, since the LDSTQ 22 has ten entries, the decoder 12 cyclically allocates integers from 0 to 9 to the LDSTQ_IDs. This means that the next entry number of LDSTQ_ID=9 is 0.

As illustrated in FIG. 2, the number of entries of the LDSTQ 22 managed by the decoder 12 is virtually increased. In the present embodiment, the ten entries are virtually quadruplicated to be 40 entries.

Virtually increasing the number of entries has a possibility that multiple instructions have the same LDSTQ_ID. To avoid this inconvenience, the decoder 12 manages the entries of the LDSTQ 22 by using LDSTQ_ID_X. The LDSTQ_ID_X is used for discriminating instructions allocated thereto the same LSDTQ_ID, and also used for determining, in a later cycle, whether the LDSTQ 22 has an empty space. Likewise the LDSTQ_ID, the LDSTQ_ID_X is sequentially allocated from the value "0", and is counted up when the LDSTQ_ID exceeds 9. In the present embodiment, the upper limit of the LDSTQ_ID_X is 3.

The upper limit of the LDSTQ_ID_X should by no means be limited to 3 and can be variously modified. For example, in cases where the number of entries is virtually increased to eight times the actual number, the upper limit of the LDSTQ_ID_X is 7, and likewise in cases where the number of entries is virtually increased to 16 times the actual number, the upper limit of the LDSTQ_ID_X is 15. The LDSTQ_ID_X is also cyclically updated and comes to be 0 when the LDSTQ_ID_X exceeds the upper limit.

The load/store unit 15 inserts a load or store instruction into an entry of the LDSTQ 22 which entry is indicated by the LDSTQ_ID, executing the load or store instruction using the requests and the addresses received at the A cycle. However, in cases where the LDSTQ 22 has no empty space at the cycle B2, no request is issued to the load/store unit 15 and therefore no instruction is inserted into the LDSTQ 22. Then the instruction is returned to the RSA 13, and no entry of the LDSTQ 22 is released.

The processor core 1 of the present embodiment includes the check_ng propagator 30a in order to avoid degrading of the performance caused from switching the order of a load instruction and a store instruction. The check_ng propagator 30a has a possibility of not issuing an instruction to the load/store unit 15 even when the LDSTQ 22 has an empty space at the cycle B2.

(B-2) Operation:

A process performed in the processor core 1 according to an example of a first embodiment configured as the above will now be described with reference to the time chart FIG. 7.

Also in FIG. 7, an example of processing the store instruction (store) and the load instruction (load) exemplarily illustrated in FIG. 3 are described.

In the example of FIG. 7, "store" is selected at the cycle 1 and "load" is selected at the cycle 2 by the RSA 13. Basically, the RSA 13 preferentially selects an older instruction. At this time point, the order of the instructions is not switched.

In the cycle 4, the actual LDSTQ manager 20 determines whether the LDSTQ 22 has an empty space for the "store". At this time point, the LDSTQ 22 is assumed to be in the status represented by the reference sign (b) of FIG. 2. As illustrated in FIG. 3, the "store" has an LDSTQ_ID of 2 and an ID_X of 1, which is not included in the thick frame of the status of the reference sign (b) of FIG. 2. For the above, the LDSTQ 22 is determined not to have an empty space, and resulted in check_ng in cycle 4.

In the processor core 1 of the present embodiment, once the check_ng is detected in the actual LDSTQ manager 20, the value "1" is issued (maintained) to the inh_ldstq_go signal over the subsequent five cycles. Thereby, over the five cycles after the check_ng is detected in the actual LDSTQ manager 20, ldstq_go=0 is input into the flip-flop 105 (address generating calculator 21).

In contrast, in relation to the "load", the actual LDSTQ manager 20 determines whether the LDSTQ 22 has an empty space at the timing of the cycle 5, and consequently the LDSTQ 22 is determined to have an empty space (check_ok). However, since the inh_ldstq_go is 1, the ldstq_go signal is dropped to "0" by the AND gate 31.

Since the ldstq_go signal is 0, "load" is not issued to the LDSTQ 22 (the issue of an instruction is inhibited) and is returned to the RSA 13. The rise of the inh_ldstq_go is triggered by the check_ng=1 at the cycle 4.

Since the cancellation of the "store" caused by check_ng involves in inhabitation of issuing the subsequent "load", a switch of the order of the "store" and the "load" directed to the same address can be avoided.

The "store" and the "load" are selected again by the RSA 13 at the cycles 7 and 8, respectively. At the cycles 10 and 11 at which the "store" and the "load" come into the cycle B2, the "store" and the "load" are both "check_ok" and the inh_ldstq_go does not rise (=0), and consequently, instructions are issued in the order of the "store" and the "load".

(B-3) Effects:

As described above, in the processor core 1 in an example of the first embodiment, in cases where the actual LDSTQ manager 20 detects lack of an empty space of the LDSTQ 22 when an instruction is to be issued, the actual LDSTQ manager 20 outputs the value "0" as the check_ok signal.

After the check_ng is detected in the actual LDSTQ manager 20, the check_ng propagator 30a inhibits issue of "1" as the ldstq_go signal over a predetermined time (in the present embodiment, five cycles). This inhibits issue of one or more subsequent instructions issued from the RSA 13 to the LDSTQ 22 and returns the instructions to the RSA 13.

As the above, in cases where a store instruction is cancelled because the LDSTQ 22 lacks the empty space, the check_ng propagator 30a involving the subsequent instructions in the cancellation for a predetermined time period. This can reduce the risk of issuing instructions again because the order of a store instruction and the load instruction switches.

Figure 8:
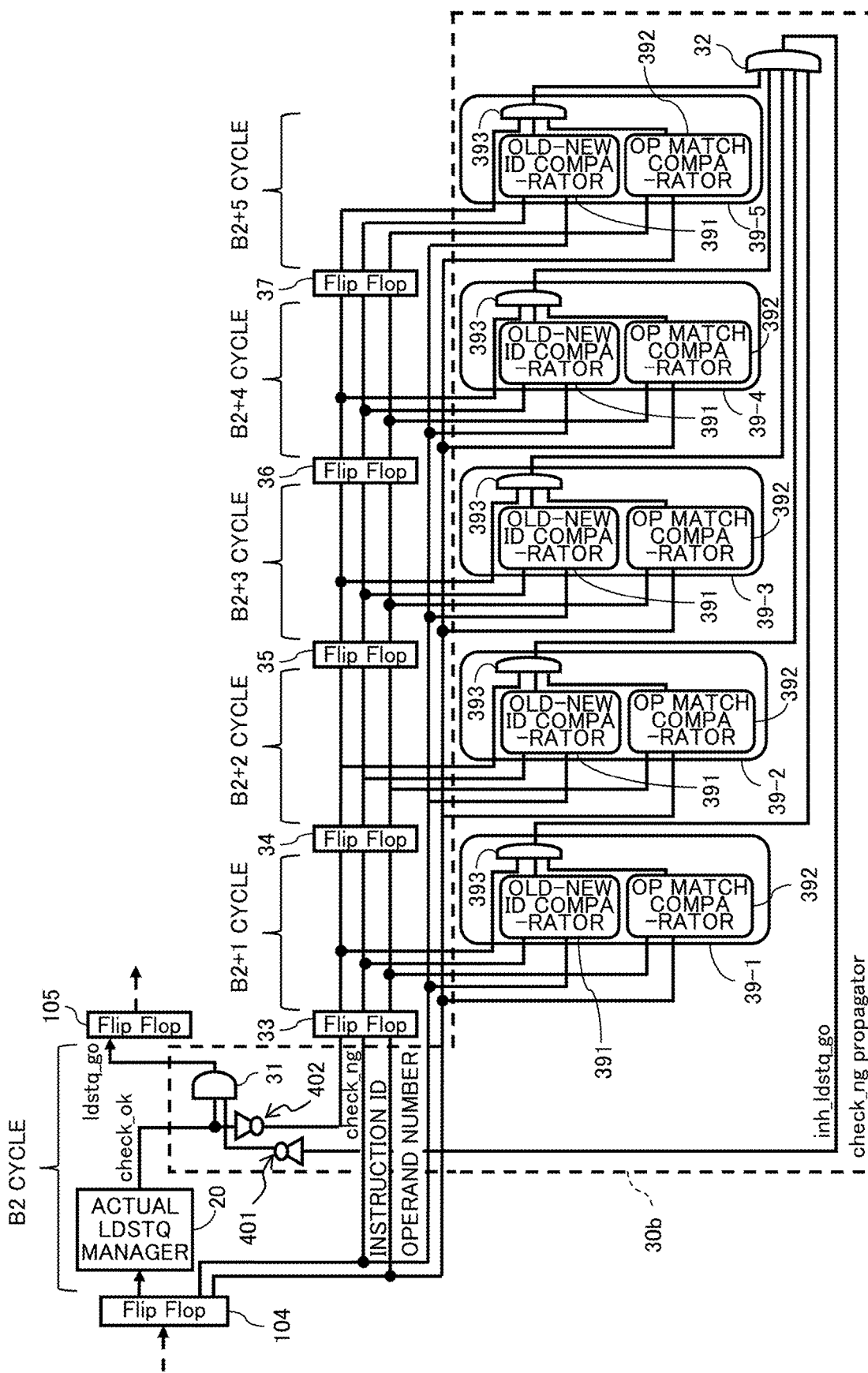
FIG. 8 is a diagram illustrating an instruction pipeline of a processor core of an example of a second embodiment.

(C) Second Embodiment (C-1) Configuration:

FIG. 8 is a diagram illustrating an instruction pipeline of the processor core 1 according to an example of the second embodiment.

The second embodiment includes a check_ng propagator 30b in place of the check_ng propagator 30a on the instruction pipeline of the processor core of the first embodiment exemplarily illustrated in FIG. 6, and the remaining configuration is the same as the instruction pipeline of the first embodiment.

Like reference numbers designate the same or substantially same elements and parts, so repetitious description is omitted here.

The check_ng propagator 30b includes ID/address comparators 39-1 to 39-5 between the respective flip-flops 33-37 and the OR gate 32. Specifically, the ID/address comparator 39-1 is provided between the flip-flop 33 and the OR gate 32; and the ID/address comparator 39-2 is provided between the flip-flop 34 and the OR gate 32.

In addition, the ID/address comparator 39-3 is provided between the flip-flop 35 and the OR gate 32; the ID/address comparator 39-4 is provided between the flip-flop 36 and the OR gate 32; and the ID/address comparator 39-5 is provided between the flip-flop 37 and the OR gate 32.

The ID/address comparators 39-1 to 39-5 have the same configuration as one another. Hereinafter, as a reference number representing the ID/address comparator, reference numbers 39-1 to 39-5 are used when one of the multiple ID/address comparators 39 needs to be specified, but a reference number 39 is used when an arbitrary ID/address comparator is described.

Each ID/address comparator 39 includes an old-new ID comparator 391, an OP match comparator 392, and an AND gate 393.

In the ID/address comparator 39, an output signal from the old-new ID comparator 391 and an output signal from the OP match comparator 392 are input into the AND gate 393.

Into the AND gate 393, a check_ng signal output from one of the flip-flops 33-37 arranged at the immediate upstream of the corresponding ID/address comparator 39 is also input.

This means that, into the AND gate 393 of the ID/address comparator 39-1, a check_ng signal output from the flip-flop 33 is input; into the AND gate 393 of the ID/address comparator 39-2, a check_ng signal output from the flip-flop 34 is input; into the AND gate 393 of the ID/address comparator 39-3, a check_ng signal output from the flip-flop 35 is input; into the AND gate 393 of the ID/address comparator 39-4, a check_ng signal output from the flip-flop 36 is input; and into the AND gate 393 of the ID/address comparator 39-5, a check_ng signal output from the flip-flop 37 is input.

Into the old-new ID comparator 391 of the ID/address comparator 39, an instruction ID (an instruction ID of the B2 cycle) output from the flip-flop 104 and an instruction ID output from the one of the flip-flops 33-37 arranged at the immediate upstream of the corresponding ID/address comparator 39 are input.

Specifically, into the old-new ID comparator 391 of the ID/address comparator 39-1, an instruction ID output from the flip-flop 33 and an instruction ID output from the flip-flop 104 are input; and into the old-new ID comparator 391 of the ID/address comparator 39-2, an instruction ID output from the flip-flop 34 and an instruction ID output from the flip-flop 104 are input.

In addition, into the old-new ID comparator 391 of the ID/address comparator 39-3, an instruction ID output from the flip-flop 35 and an instruction ID output from the flip-flop 104 are input; into the old-new ID comparator 391 of the ID/address comparator 39-4, an instruction ID output from the flip-flop 36 and an instruction ID output from the flip-flop 104 are input; and into the old-new ID comparator 391 of the ID/address comparator 39-5, an instruction ID output from the flip-flop 37 and an instruction ID output from the flip-flop 104 are input.

In relation to an instruction ID, the instruction ID of an instruction issued later is set to have a larger value than that of an instruction issued earlier. Accordingly, by referring the respective instruction IDs among multiple issued instructions, the order of issuing the instructions can be specified.

Also in the second embodiment, an instruction ID and an operand register number (hereinafter simply referred to as an operand number) are sequentially propagated from the flip-flop 104 to the flip-flops 33-37 likewise a check_ng signal. In the example of FIG. 8, the check_ng signal, instruction ID, and operand number are propagated over five cycles of from the B2 cycle to the B2+5 cycles are propagated.

A check_ok signal output from the actual LDSTQ manager 20 is input into the AND gate 31 and the invertor circuit 402. The invertor circuit 402 inputs the check_ng signal, which is obtained by inverting the check_ok signal, into the flip-flop 33.

An instruction ID and an operand number issued from the flip-flop 104 are input into the flip-flop 33 and the ID/address comparators 39-1 to 39-5.

At the downstream of the flip-flop 33, the flip-flops 34-37 are arranged in series. With this configuration, a check_ng signal output from the invertor circuit 402, an instruction ID, and an operand number are sequentially propagated to the multiple (in the present embodiment, five) flip-flops 33-37 and then input into an OR gate 32 via the ID/address comparator 39-5.

The old-new ID comparator 391 compares the input instruction ID of the B2 cycle and the instruction ID input from the flip-flop arranged at the immediate upstream of the ID/address comparator 39 (hereinafter referred to as a local ID/address comparator 39) that includes the old-new ID comparator 391 itself. In other words, in the old-new ID comparator 391, the instruction ID (ID of an instruction involved to be cancelled) of the B2 cycle and an instruction ID of any one of the B2+1 cycle to the B2+5 cycle.

If the instruction ID of the B2 cycle is newer than the instruction ID of the one of the B2+1 cycle to the B2+5 cycle, the old-new ID comparator 391 outputs the value "1"; and if the instruction ID of the B2 cycle is not newer than the instruction ID of the one of the B2+1 cycle to the B2+5 cycle, the old-new ID comparator 391 outputs the value "0".

The output signal of the old-new ID comparator 391 is input into the AND gate 393. Accordingly, in cases where the instruction ID of the B2 cycle is not newer than the instruction ID of the one of the B2+1 cycle to the B2+5 cycle, the value "0" is input into the AND gate 393. This resets the check_ng signal to 0, and in the actual LDSTQ manager 20, subsequent instructions of predetermined cycles to the instruction determined to be check_ng are involved to be cancelled.

In addition, into the OP match comparator 392 of the ID/address comparator 39, an operand number (an operand number of the B2 cycle) output from the flip-flop 104 and an operand number output from one of the flip-flops 33-37 at the immediate upstream of the corresponding ID/address comparator 39 are input.

Specifically, into the OP match comparator 392 of the ID/address comparator 39-1, an operand number output from the flip-flop 33 and an operand number output from the flip-flop 104 are input; and into the OP match comparator 392 of the ID/address comparator 39-2, an operand number output from the flip-flop 34 and an operand number output from the flip-flop 104 are input.

In addition, into the OP match comparator 392 of the ID/address comparator 39-3, an operand number output from the flip-flop 35 and an operand number output from the flip-flop 104 are input; into the OP match comparator 392 of the ID/address comparator 39-4, an operand number output from the flip-flop 36 and an operand number output from the flip-flop 104 are input; and into the OP match comparator 392 of the ID/address comparator 39-5, an operand number output from the flip-flop 37 and an operand number output from the flip-flop 104 are input.

The old-new ID comparator 391 compares an input operand number of the B2 cycle and an operand number input from the flip-flop arranged at the immediate upstream of the local ID/address comparator 39. Namely, in the OP match comparator 392, an instruction ID of the B2 cycle (the number of the register that is used by an instruction involved to be cancelled) of the B2 cycle and an operand number of one of the B2+1 cycle to the B2+5 cycle.

If the operand number of the B2 cycle matches the operand number of one of the B2+1 cycle to the B2+5 cycle, the OP match comparator 392 outputs the value "1", and if the operand numbers do not match, the OP match comparator 392 outputs the value "0".

The output signal of the OP match comparator 392 is input into the AND gate 393. Thereby, in cases where the operand number of the B2 cycle does not match the operand number of one of the B2+1 cycle to the B2+5 cycle, the value "0" is input into the AND gate 393. This resets the check_ng signal to "0", and when the actual LDSTQ manager 20 refers to an instruction that refers to the same operand as the instruction determined to be check_ng, the instruction involves one or more subsequent instructions in cancellation of the instructions.

If it is desired that operands to be compared are increased, the ID/address comparator 39 increases the OP match comparators 392 to increase inputs of the AND gate 393. Likewise, if it is desired to obtain a strict match including an immediate or if another condition is to be increased, the number of the old-new ID comparators and the inputs into the AND gate 393 are satisfactorily increased.

In the check_ng propagator 30b, the outputs of the ID/address comparator 39 of from the B2+1 cycle to the B2+5 cycle instruct that the B2 cycle is involved in cancellation. The outputs from the ID/address comparators 39 is combined by the OR gate 32 and is consequently regarded as the inh_ldstq_go signal.

The inh_ldstq_go signal is inverted by the AND gate 411 and then input into the AND gate 31. The AND gate 31 outputs, as a ldstq_go signal, the result of AND of the inverted inh_ldstq_go signal and a check_ok signal, which is the output of the actual LDSTQ manager 20 at the B2 cycle. The ldstq_go signal is input into the flip-flop 105.

Accordingly, if the inh_ldstq_go signal is "1", the check_ng propagator 30b resets the check_ok signal to "0" and inhibits (cancels) issue of an instruction to the LDSTQ 22 and returns the instruction to the RSA 13.

Figure 9:
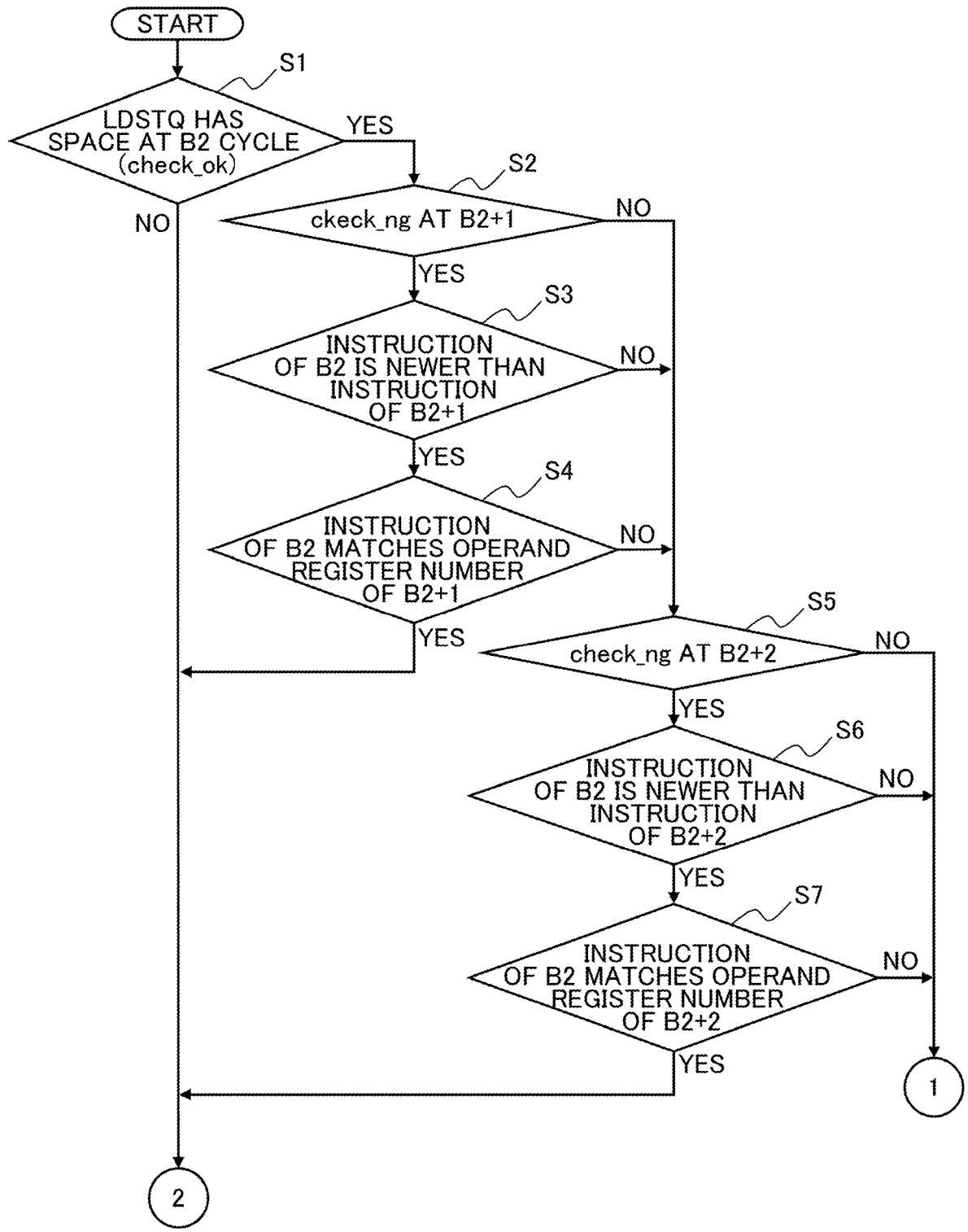
FIG. 9 is a flow diagram illustrating a process performed in a processor core of an example of the second embodiment.
Figure 10:
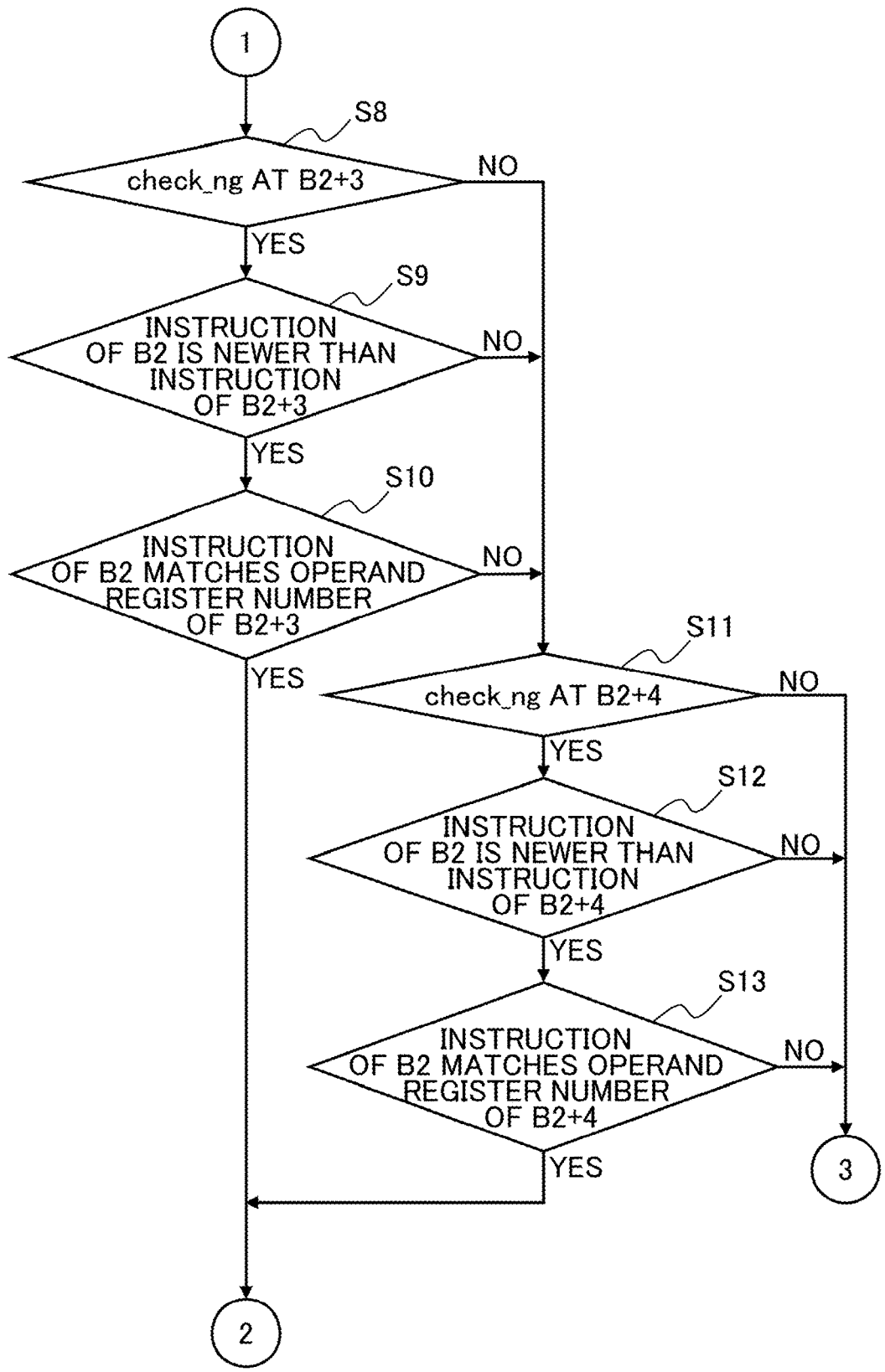
FIG. 10 is a flow diagram illustrating a process performed in a processor core of an example of the second embodiment.
Figure 11:
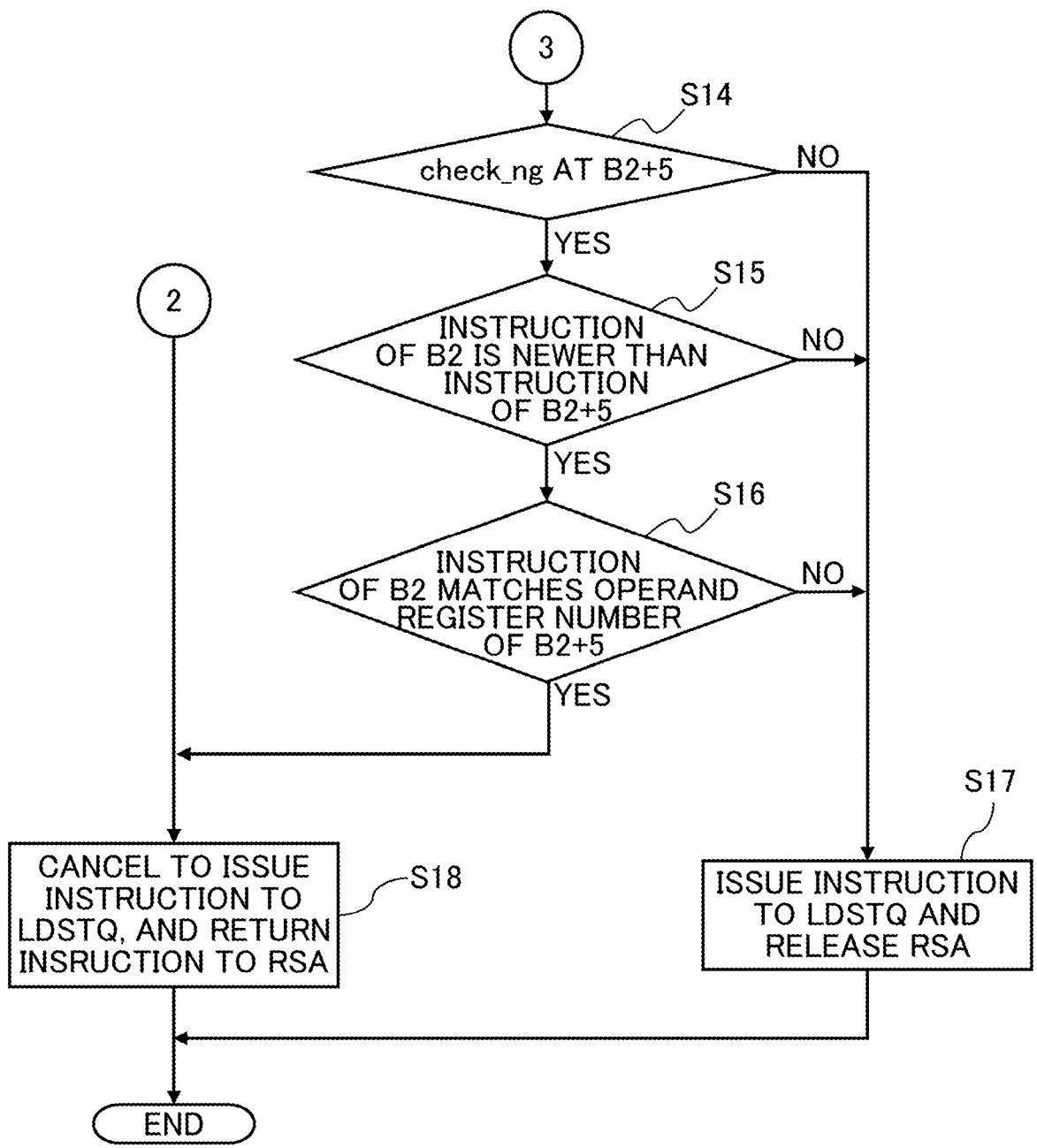
FIG. 11 is a flow diagram illustrating a process performed in a processor core of an example of the second embodiment.

(C-2) Operation:

The process performed by the processor core 1 of an example of the second embodiment will now be described with reference to the flow diagrams of FIGS. 9-11 (Steps S1-S18). FIG. 9 illustrates a process of Steps S1-S7; FIG. 10 illustrates a process of Steps S8-S13; and FIG. 11 illustrates a process of Steps S14-S18.

In Step S1 of FIG. 9, the actual LDSTQ manager 20 determines whether the LDSTQ 22 has an empty space at the B2 cycle for a store instruction (local instruction) to be processed. If the LDSTQ 22 has no empty space (see No route in Step S1), the process moves to Step S18 in FIG. 11.

In step S18, a process that does not issue an instruction to the LDSTQ 22, cancels the instruction, and returns the instruction to the RSA 13 is carried out. After that, the process ends.

On the other hand, in cases where the LDSTQ 22 has an empty space as a result of the determination in Step S1 (see Yes route in Step S1), the process moves to Step S2 of FIG. 9.

In step S2, confirmation as to whether the B2+1 cycle is in the state of check_ng=1. As a result of the confirmation, in cases where the B2+1 cycle is in the state of check_ng=1 (see YES route in Step S2), the store instruction of the B2 cycle has a possibility of being involved to be cancelled by the cycle B2+1. In order to narrow the condition for involving and cancelling, the process moves to Step S3 of FIG. 9.

In Step S3, the old-new ID comparator 392 checks whether the instruction of the B2 cycle is newer than the instruction of the B2+1 cycle (instruction order requirement).

As a result of the confirmation, in cases where the instruction of the B2 cycle is newer than the instruction of the B2+1 cycle (see YES route in Step S3), the process moves to Step S4 of FIG. 9.

In Step S4, the OP match comparator 392 checks whether the operand register numbers of the instructions of the B2 cycle and the B2+1 cycle match (access destination match requirement).

As a result of the confirmation, in cases where the operand register numbers of the instructions of the B2 cycle and the B2+1 cycle match (see YES route in Step S4), the process moves to Step S18 of FIG. 11. In Step S18, since the condition for involving and cancelling is satisfied, the process that does not issue the instruction to the LDSTQ 22 but cancels the instruction and returns the instruction to the RSA 13 is executed, and then the process ends.

As a result of the confirmation at Step S2, in cases where the B2+1 cycle is in the state of check_ng=0 (see NO route in Step S2), the process moves to Step S5 of FIG. 9. In cases where the instruction of the B2 cycle is not newer than the instruction of the B2+1 cycle as a result of the confirmation in Step S3 (see NO route in Step S3), the process moves to Step S5. Furthermore, as a result of the confirmation in Step S4, the operand register numbers of the instructions of the B2 cycle and the B2+1 cycle do not match (see NO route in Step S4), the process also moves to Step S5.

In step S5, whether the B2+2 cycle is in the state of check_ng=1 is confirmed. As a result of the confirmation, in cases where the B2+2 cycle is in the state of check_ng=1 (see YES route in Step S5), the instruction of the B2 cycle has a possibility of being involved to be cancelled by the B2+2 cycle. In order to narrow the condition for involving and cancelling, the process moves to step S6 of FIG. 9.

In step S6, the old-new ID comparator 391 checks whether the instruction of the B2 cycle is newer than the instruction of the B2+2 cycle (instruction order requirement).

In cases where the instruction of the B2 cycle is newer than the instruction of the B2+2 cycle as a result of the confirmation (see YES route in Step S6), the process moves to Step S7 of FIG. 9.

In Step S7, the OP match comparator 392 checks whether the operand register numbers of the instructions of the B2 cycle and the B2+2 cycle match (access destination match requirement).

As a result of the confirmation, in cases where the operand register numbers of the instructions of the B2 cycle and the B2+2 cycle match (see YES route in Step S7), the process moves to Step S18 of FIG. 11.

As a result of the confirmation in Step S5, in cases where the B2+2 cycle is in the state of check_ng=0 (see NO route in Step S5), the process moves to Step S8 of FIG. 10. In cases where the instruction of the B2 cycle is not newer than the instruction of the B2+2 cycle as a result of the confirmation in Step S6 (see NO route in Step S6), the process moves to Step S8. Furthermore, as a result of the confirmation in Step S7, the operand register numbers of the instructions of the B2 cycle and the B2+2 cycle do not match (see NO route in Step S7), the process moves to Step S8.

In step S8, whether the B2+3 cycle is in the state of check_ng=1 is confirmed. As a result of the confirmation, in cases where the B2+3 cycle is in the state of check_ng=1 (see YES route in Step S8), the instruction of the B2 cycle has a possibility of being involved to be cancelled by the B2+3 cycle. In order to narrow the condition for involving and cancelling, the process moves to step S9 of FIG. 10.

In step S9, the old-new ID comparator 391 checks whether the instruction of the B2 cycle is newer than the instruction of the B2+3 cycle (instruction order requirement).

In cases where the instruction of the B2 cycle is newer than the instruction of the B2+3 cycle as a result of the confirmation (see YES route in Step S9), the process moves to Step S10 of FIG. 10.

In Step S10, the OP match comparator 392 checks whether the operand register numbers of the instructions of the B2 cycle and the B2+3 cycle match (access destination match requirement).

As a result of the confirmation, in cases where the operand register numbers of the instructions of the B2 cycle and the B2+3 cycle match (see YES route in Step S10), the process moves to Step S18 of FIG. 11.

As a result of the confirmation in Step S8, in cases where the B2+3 cycle is in the state of check_ng=0 (see NO route in Step S8), the process moves to Step S11 of FIG. 10. In cases where the instruction of the B2 cycle is not newer than the instruction of the B2+3 cycle as a result of the confirmation in Step S9 (see NO route in Step S9), the process moves to Step S11. Furthermore, as a result of the confirmation in Step S10, the operand register numbers of the instructions of the B2 cycle and the B2+3 cycle do not match (see NO route in Step S10), the process also moves to Step S11.

In step S11, whether the B2+4 cycle is in the state of check_ng=1 is confirmed. As a result of the confirmation, in cases where the B2+4 cycle is in the state of check_ng=1 (see YES route in Step S11), the instruction of the B2 cycle has a possibility of being involved to be cancelled by the B2+4 cycle. In order to narrow the condition for involving and cancelling, the process moves to step S12 of FIG. 10.

In step S12, the old-new ID comparator 391 checks whether the instruction of the B2 cycle is newer than the instruction of the B2+4 cycle (instruction order requirement).

In cases where the instruction of the B2 cycle is newer than the instruction of the B2+4 cycle as a result of the confirmation (see YES route in Step S12), the process moves to Step S13 of FIG. 10.

In Step S13, the OP match comparator 392 checks whether the operand register numbers of the instructions of the B2 cycle and the B2+4 cycle match (access destination match requirement).

As a result of the confirmation, in cases where the operand register numbers of the instructions of the B2 cycle and the B2+4 cycle match (see YES route in Step S13), the process moves to Step S18 of FIG. 11.

As a result of the confirmation in Step S11, in cases where the B2+4 cycle is in the state of check_ng=0 (see NO route in Step S11), the process moves to Step 314 of FIG. 11. In cases where the instruction of the B2 cycle is not newer than the instruction of the B2+4 cycle as a result of the confirmation in Step S12 (see NO route in Step S12), the process moves to Step S14. Furthermore, as a result of the confirmation in Step S13, the operand register numbers of the instructions of the B2 cycle and the B2+4 cycle do not match (see NO route in Step S13), the process also moves to Step S14.

In step S14, whether the B2+5 cycle is in the state of check_ng=1 is confirmed. As a result of the confirmation, in cases where the B2+5 cycle is in the state of check_ng=1 (see YES route in Step S14), the instruction of the B2 cycle has a possibility of being involved to be cancelled by the B2+5 cycle. In order to narrow the condition for involving and cancelling, the process moves to step S15 of FIG. 11.

In step S15, the old-new ID comparator 391 checks whether the instruction of the B2 cycle is newer than the instruction of the B2+5 cycle (instruction order requirement).

In cases where the instruction of the B2 cycle is newer than the instruction of the B2+5 cycle as a result of the confirmation (see YES route in Step S15), the process moves to Step S16 of FIG. 11.

In Step S16, the OP match comparator 392 checks whether the operand register numbers of the instructions of the B2 cycle and the B2+5 cycle match (access destination match requirement).

As a result of the confirmation, in cases where the operand register numbers of the instructions of the B2 cycle and the B2+5 cycle match (see YES route in Step S16), the process moves to Step S18.

As a result of the confirmation at Step S14, in cases where the B2+5 cycle is in the state of check_ng=0 (see NO route in Step S14), the process moves to Step S17 of FIG. 11. In cases where the instruction of the B2 cycle is not newer than the instruction of the B2+5 cycle as a result of the confirmation in Step S15 (see NO route in Step S15), the process moves to Step S17. Furthermore, as a result of the confirmation in Step S16, the operand register numbers of the instructions of the B2 cycle and the B2+5 cycle do not match (see NO route in Step S16), the process also moves to Step S17.

In Step S17, the instruction is determined not to be involved to be cancelled by the antecedent instruction, and then a process that issues the instruction to the LDSTQ 22 and releases the RSA 13. Then the process ends.

(C-3) Effect:

As described above, in the processor core 1 of the second embodiment, the ID/address comparator 39 of the check_ng propagator 30b inhibits issue of an instruction to the LDSTQ 22 in cases where the instruction ID of the B2 cycle is newer than any one of the instruction IDs of the B2+1 to B2+5 cycles. The old-new ID comparator 391 confirms whether multiple instructions are issued to the LDSTQ 22 in a correct order defined in advance by comparing the instruction IDs of the multiple instructions to be issued to the LDSTQ 22. This means that the old-new ID comparator 391 determines whether the multiple instructions satisfy the instruction order requirement that the multiple instructions are issued to the LDSTQ 22 in a correct order defined in advance.

In cases where the operand number of the B2 cycle matches the operand number of any one of the B2+1 to B2+5 cycles, the ID/address comparator 39 of the check_ng propagator 30b inhibits issue of an instruction to the LDSTQ 22. This means that the OP match comparator 392 determines whether the multiple instruction satisfy an access destination match requirement that the numbers (operand numbers) of the registers to be used in address calculation match.

In cases where the empty space check of the LDSTQ 22 by the actual LDSTQ manager 20 results in check_ng and also both the instruction order requirement and the access destination match requirement are satisfied, the check_ng propagator 30b inhibits issue of an instruction to the LDSTQ 22 and returns the instruction to the RSA 13.

By including the instruction ID of the B2+n cycle being the check_ng=1 in the condition, the issue of an instruction of the B2 cycle can be inhibited.

As the above, the second embodiment sets the condition for inhibiting issue of an instruction to the LDSTQ 22 and returning the instruction to the RSA 13 to be stricter than that of the first embodiment. This enables the processor core 1 of the second embodiment to attain the same actions and effects as those of the above first embodiment and additionally to prevent issue of an instruction to the LDSTQ 22 from being excessively inhibited.

(D) Miscellaneous

The present invention should by no means be limited to the embodiments described above and may be variously modified without departing from the scope of the present invention.

Alternatively, in cases where a different requirement from the instruction order requirement based on instruction IDs and the access destination match requirement based on operand numbers is satisfied, a process that inhibits issue of an instruction to the LDSTQ 22 and returns the instruction to the RSA 13 may be carried out.

Figure 12:
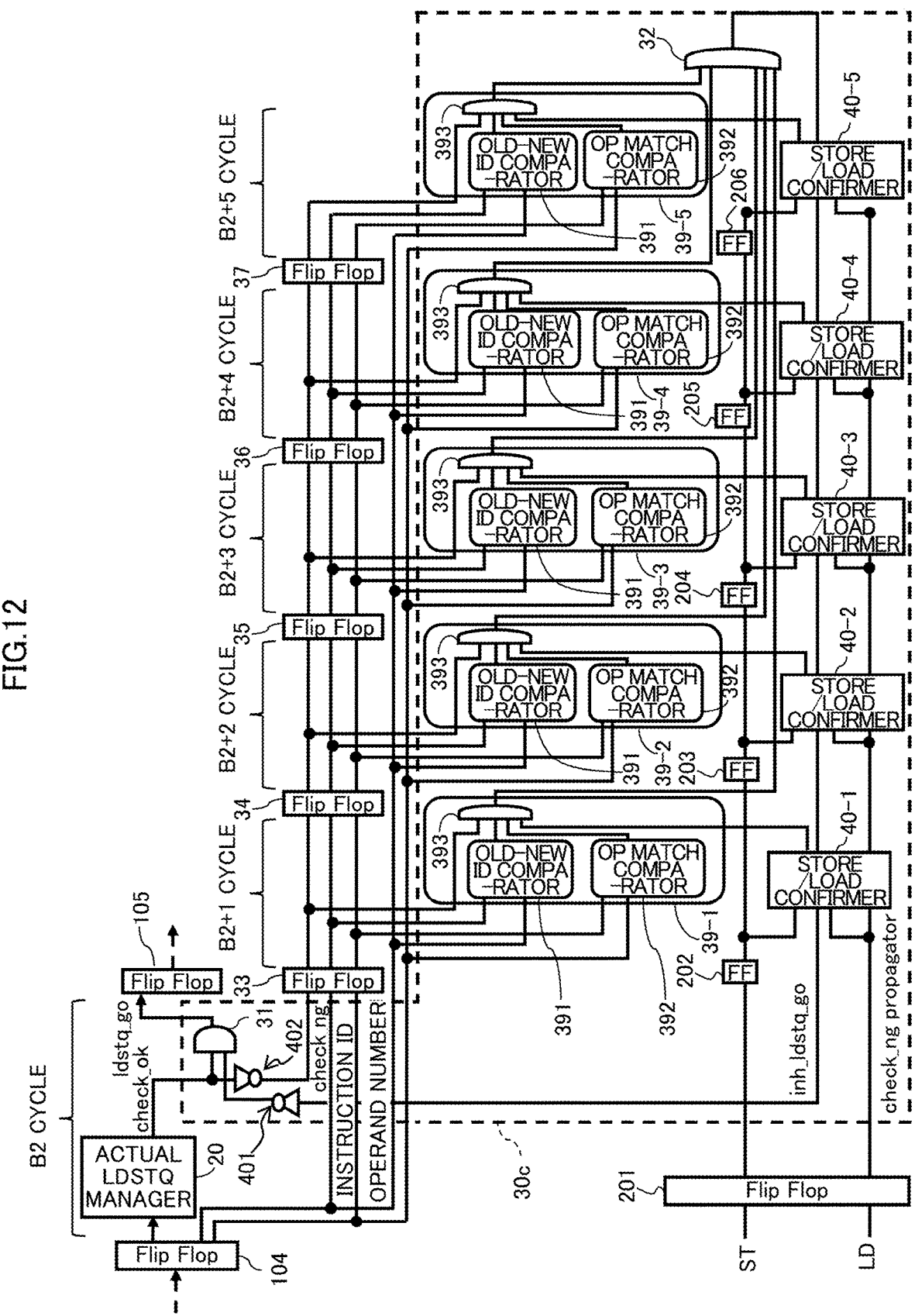
FIG. 12 is a diagram exemplarily illustrating a modification to an instruction pipeline of a processor core of the second embodiment.

FIG. 12 is a diagram illustrating a modification to the instruction pipeline of the processor core 1 according to the second embodiment.

The instruction pipeline exemplarily illustrated in FIG. 12 includes a check_ng propagator 30c in place of the check_ng propagator 30b exemplarily illustrated in FIG. 8. The check_ng propagator 30c additionally includes store/load confirmers 40-1 to 40-5 to the elements of the check_ng propagator 30b.

The store/load confirmers 40-1 to 40-5 are provided in association with the ID/address comparators 39-1 to the 39-5, respectively.

The store/load confirmers 40-1 to 40-5 are the same configuration as one another. Hereinafter, as a reference number representing the store/load confirmer, reference numbers 40-1 to 40-5 are used when one of the multiple store/load confirmers 40 needs to be specified, but a reference number 40 is used when an arbitrary store/load confirmer is described.

The store/load confirmer 40 determines whether an instruction type requirement that a load instruction is issued after a store instruction is satisfied.

Into the flip-flop 201, a store instruction (ST) and a load instruction (LD) are input. The flip-flop 201 outputs the store instruction and the load instruction.

The load instruction output from the flip-flop 201 is input into the store/load confirmers 40-1 to 40-5.

FIG. 1.3 is a diagram exemplarily illustrating a configuration of a store/load confirmer 40 of a modification to the processor core 1 of the second embodiment.

As illustrated in FIG. 13, the store/load confirmer 40 includes a AND gate 411. Into the AND gate 401 of each store/load confirmer 40, a load instruction of the B2 cycle is input via the flip-flop 201.

The store instruction output from the flip-flop 201 is propagated sequentially to the multiple (in the present embodiment, five) flip-flops 202-206.

The flip-flop 202 corresponds to the B2+1 cycle; the flip-flop 203 corresponds to the B2+2 cycle; the flip-flop 204 corresponds to the B2+3 cycle; the flip-flop 205 corresponds to the B2+4 cycle; and the flip-flop 206 corresponds to the B2+5 cycle.

The store instruction output from the flip-flop 202 is input into the flip-flop 203 and also into the AND gate 411 of the store/load confirmer 40-1. The store instruction output from the flip-flop 203 is input into the flip-flop 204 and also into the AND gate 411 of the store/load confirmer 40-2. The store instruction output from the flip-flop 204 is input into the flip-flop 205 and also into the AND gate 411 of the store/load confirmer 40-3. The store instruction output from the flip-flop 205 is input into the flip-flop 206 and also into the AND gate 411 of the store/load confirmer 40-4. The store instruction output from the flip-flop 206 is input into the AND gate 411 of the store/load confirmer 40-5.

In the store/load confirmer 40, a load instruction (B2_LD) of the B2 cycle and a store instruction (B2+n_ST) of one of the B2+1 to B2+5 cycles are input into the AND gate 411. Then, an output from the AND gate 411 is input into the AND gate 393 of the corresponding ID/address comparator 39.

Thereby, the store/load confirmer 40 confirms that the load instruction (B2_LD) of the B2 cycle is issued after the store instruction (B2+n_ST) issued at the cycles (i.e., B2+1 to B2+5 cycles) prior to the B2 cycle. As a result of the confirmation, if the load instruction is issued after the store instruction, the store/load confirmer 40 inputs the value "1" into the corresponding AND gate 393. In contrast, if the load instruction is not issued after the store instruction, the store/load confirmer 40 inputs the value "0" into the corresponding AND gate 393.

This resets the check_ng signal to "0", and consequently, only in cases where the instruction type requirement that a load instruction (B2) is issued after a store instruction (B2+1 to B2+5), the actual LDSTQ manager 20 can involve one or more instructions subsequent to the instruction determined to be check_ng over predetermined cycles.

In the modification to the second embodiment described above, in cases where the instruction order requirement based on instruction IDs, the access destination match requirement based on operand numbers, and the instruction type requirement based on the order of a store instruction and a load instruction are satisfied, a process that inhibits issue of an instruction to the LDSTQ 22 and returns the instruction to the RSA 13 is carried out, but the process that is to be carried out is not limited to this.

Alternatively, in cases where one of the instruction order requirement based on instruction IDs and the access destination match requirement based on operand numbers is satisfied, the process that inhibits issuing of an instruction to the LDSTQ 22 and returns the instruction to the RSA 13 may be carried out.

Since the processor core 1 of the foregoing embodiments and the modifications assumes control in an out-of-order fashion, and consequently instructions selected by the RSA 13 may sometimes be different from their original order of instructions. Therefore, inh_ldstq_go caused by a store instruction determined to be check_ng has a possibility of affecting an instruction antecedent to the store instruction, and as a solution to the above, a control that compares the instruction IDs and then involves only a subsequent instruction to be cancelled may be carried out.

Even if the order of a store instruction and a load instruction is switched, no problem arises if addresses to be accessed by these instructions are different. To narrow the cancellation target, a scheme that compares the register numbers of the operands to be used in address calculation and, only when the register numbers match and involves the instruction to be cancelled may be suggested. This alternative is not able to avoid a case where the memory addresses accidently match even if the register numbers to be used in address calculations are totally different. As the intention of the program, since when data in a fixed point register is evacuated to the memory in obedience to a store instruction and then restored by a load instruction, for example, a register used in address calculation is frequently used for various purposes, such narrowing a target can be regarded to be effective. For this case, the number of operands checked whether to match is one or more.

The embodiments can be carried out and manufactured by those ordinary skilled in the art referring to the above disclosure.

According to the foregoing embodiments, occurrence of switching the order of a store instruction and a load instruction can be inhibited.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A calculation processing apparatus comprising:
   a cache memory;
   a decoder that decodes a plurality of memory access instructions;
   a storing device that stores the plurality of memory access instructions decoded by the decoder and outputs the memory access instruction stored therein to the cache memory;
   a determining circuit that determines whether the storing device has an empty space to store the plurality of memory access instructions; and
   an inhibiting circuit that inhibits, when the determining circuit determines that the storing device does not have an empty space to store a first memory access instruction included in the plurality of memory access instructions, execution of a second memory access instruction being included in the plurality of memory access instructions and being subsequent to the first memory access instruction for a predetermined time period, regardless of a result of determination made on the second memory access instruction by the determining circuit.

2. The calculation processing apparatus according to claim 1, wherein:

the inhibiting circuit comprising
a plurality of signal holding circuits that are arranged in series and that propagate a signal based on an output signal being output from the determining circuit and representing a result of the determination made by the determining circuit, and
an OR gate that receives a signal output from each of the plurality of signal holding circuits and that outputs an output inhibiting signal; and
the inhibiting circuit keeps a state of inhibiting execution of the second memory access instruction for the predetermined time period corresponding to the number of the plurality of signal holding circuits.

3. The calculation processing apparatus according to claim 1, wherein:
the inhibiting circuit comprising an order requirement determining circuit that determines whether the plurality of memory access instruction satisfy an instruction order requirement that the plurality of memory access instructions are being processed in a predetermined order; and
when the instruction order requirement is satisfied, the inhibiting circuit inhibits execution of the second memory access instruction.

4. The calculation processing apparatus according to claim 1, wherein:
the inhibiting circuit comprising a match requirement determining circuit that determines whether the plurality of memory access instructions satisfy an access destination match requirement that access destinations of the plurality of memory access instructions match; and
when the access destination match requirement is satisfied, the inhibiting circuit inhibits execution of the second memory access instruction.

5. The calculation processing apparatus according to claim 1, wherein:
the inhibiting circuit comprising an instruction type requirement determining circuit that determines whether to satisfy an instruction type requirement that a load instruction is issued after a store instruction; and
when the instruction type requirement is satisfied, the inhibiting circuit inhibiting execution of the second memory access instruction.

6. A method of controlling a calculation processing apparatus comprising a cache memory, a decoder that decodes a plurality of memory access instructions, and a storing device that stores the plurality of memory access instructions decoded by the decoder and outputs the memory access instruction stored therein to the cache memory, the method comprising:
determining whether the storing device has an empty space to store the plurality of memory access instructions; and
inhibiting, when the storing device is determined not to have an empty space to store a first memory access instruction included in the plurality of memory access instructions, execution of a second memory access instruction being included in the plurality of memory access instructions and being subsequent to the first memory access instruction for a predetermined time period, regardless of a result of the determining made on the second memory access instruction.

7. The method according to claim 6, wherein
the calculation processing apparatus further comprises a plurality of signal holding circuits that are arranged in series and that propagate a signal based on an output signal representing a result of the determining, and an OR gate that receives a signal output from each of the plurality of signal holding circuits and that outputs an output inhibiting signal; and
the method further comprising keeping a state of inhibiting execution of the second memory access instruction for the predetermined time period corresponding to the number of the plurality of signal holding circuits.

8. The method according to claim 6 further comprising:
determining whether the plurality of memory access instruction satisfy an instruction order requirement that the plurality of memory access instructions are being processed in a predetermined order; and
when the instruction order requirement is satisfied, inhibiting execution of the second memory access instruction.

9. The method according to claim 6 further comprising:
determining whether the plurality of memory access instructions satisfy an access destination match requirement that access destinations of the plurality of memory access instructions match; and
when the access destination match requirement is satisfied, inhibiting execution of the second memory access instruction.

10. The method according to claim 6 further comprising:
determining whether to satisfy an instruction type requirement that a load instruction is issued after a store instruction; and
when the instruction type requirement is satisfied, inhibiting execution of the second memory access instruction.

* * * * *